US008033358B2

(12) United States Patent
Ivers

(10) Patent No.: US 8,033,358 B2
(45) Date of Patent: Oct. 11, 2011

(54) NOISE CONTROLLED TURBINE ENGINE WITH AIRCRAFT ENGINE ADAPTIVE NOISE CONTROL TUBES

(75) Inventor: Douglas E. Ivers, Cary, NC (US)

(73) Assignee: Lord Corporation, Cary, NC (US)

( * ) Notice: Subject to any disclaimer, the term of this patent is extended or adjusted under 35 U.S.C. 154(b) by 38 days.

(21) Appl. No.: 12/109,675

(22) Filed: Apr. 25, 2008

(65) Prior Publication Data

US 2008/0296431 A1 Dec. 4, 2008

Related U.S. Application Data

(60) Provisional application No. 60/914,208, filed on Apr. 26, 2007.

(51) Int. Cl.
B64D 33/02 (2006.01)
F01N 1/06 (2006.01)
B64D 33/00 (2006.01)
F01N 1/00 (2006.01)
F04D 29/66 (2006.01)

(52) U.S. Cl. ........ 181/214; 181/250; 181/254; 181/278; 244/1 N; 244/53 B; 415/119

(58) Field of Classification Search .................. 181/214, 181/219, 250, 253, 254, 266, 273, 276, 277, 181/278; 244/1 N, 53 B; 415/119
See application file for complete search history.

(56) References Cited

U.S. PATENT DOCUMENTS

| 3,572,960 | A | * | 3/1971 | McBride ...................... 415/115 |
| 3,951,566 | A | * | 4/1976 | Mattei et al. .................. 415/115 |
| 4,199,295 | A | * | 4/1980 | Raffy et al. ................... 415/115 |
| 4,255,083 | A | * | 3/1981 | Andre et al. .................. 415/119 |
| 4,731,992 | A | * | 3/1988 | Krumscheid ................... 60/281 |
| 5,333,576 | A | * | 8/1994 | Verkleeren ............... 123/184.53 |
| 5,431,533 | A | * | 7/1995 | Hobbs .......................... 415/58.7 |
| 5,607,284 | A | * | 3/1997 | Byrne et al. .................. 415/58.5 |
| 5,732,547 | A | * | 3/1998 | Olsen et al. ..................... 60/204 |
| 5,821,474 | A |   | 10/1998 | Olszok et al. |

(Continued)

FOREIGN PATENT DOCUMENTS

WO 00/20748 A2 4/2000

(Continued)

OTHER PUBLICATIONS

Lord Corporation, Patent Application No. PCT/US2008/061543, Filed Apr. 25, 2008, PCT International Search Report and Written Opinion, Date Mailed: Nov. 24, 2009.

(Continued)

*Primary Examiner* — Edgardo San Martin
(74) *Attorney, Agent, or Firm* — Edward F. Murphy, III

(57) ABSTRACT

An aircraft turbine engine with a takeoff fan speed and a landing fan speed, the aircraft engine includes a fan duct with a HQ (Herschel-Quincke) acoustic control noise reduction tube. The acoustic control noise reduction tube contains a movable frequency tuner obstruction. The movable frequency tuner obstruction is movable within the acoustic control noise reduction tube, with the movable frequency tuner obstruction movable along a fixed tube path length between a first takeoff frequency obstruction tube path location, and a second landing frequency obstruction tube path location, with the frequency tuner obstruction positioned at the first takeoff frequency location with the takeoff speed, and the frequency tuner obstruction positioned at the second landing frequency location with the landing speed to reduce noise.

52 Claims, 22 Drawing Sheets

U.S. PATENT DOCUMENTS

| | | | |
|---|---|---|---|
| 5,917,161 A | 6/1999 | Fuhrmann | |
| 5,934,611 A * | 8/1999 | Tindell et al. | 244/53 B |
| 5,971,098 A | 10/1999 | Suzuki et al. | |
| 6,112,514 A * | 9/2000 | Burdisso et al. | 60/226.1 |
| 6,422,192 B1 * | 7/2002 | Bloomer | 123/184.57 |
| 6,546,734 B2 * | 4/2003 | Antoine et al. | 60/772 |
| 6,595,320 B2 * | 7/2003 | Hwang et al. | 181/253 |
| 6,633,646 B1 * | 10/2003 | Hwang | 381/71.5 |
| 7,047,725 B2 * | 5/2006 | Moe et al. | 60/262 |
| 7,055,648 B2 * | 6/2006 | Byrne et al. | 181/241 |
| 7,089,901 B2 * | 8/2006 | Kino et al. | 123/184.57 |
| 7,331,421 B2 | 2/2008 | Olsen et al. | |
| 7,416,051 B2 * | 8/2008 | Byrne et al. | 181/254 |
| 7,497,300 B2 * | 3/2009 | D'Angelo | 181/241 |
| 7,527,126 B2 * | 5/2009 | Kuroda et al. | 181/254 |
| 7,533,760 B1 * | 5/2009 | D'Angelo | 181/241 |
| 7,631,483 B2 * | 12/2009 | Mani et al. | 60/226.1 |
| 2005/0205354 A1 * | 9/2005 | Goenka et al. | 181/277 |
| 2006/0086564 A1 * | 4/2006 | Kostun et al. | 181/250 |
| 2006/0219475 A1 | 10/2006 | Olsen et al. | |

FOREIGN PATENT DOCUMENTS

WO        02/059474 A2    8/2002

OTHER PUBLICATIONS

Stewart, "The Theory of the Herschel-Quinke Tube," Physical Review, 31, 696-698 (1928).

Selamet et al., "The Herschel-Quinke Tube: A Theoretical, Computational, and Experimental Investigation," J. Accoust. Soc. Am., 96 (5) 3177-3185, (1994).

Hallez et al, "Control of Higher-Order Modes in Ducts Using Arrays of Herschel-Quinke Waveguides," presented in the meeting Control of Vibration and Noise—New Millennium, ASME, Nov. 5-10, 2000, Orlando, USA.

Smith et al, "Experiments with Fixed and Adaptive Herschel-Quinck Waveguides on the Pratt and Whitney JT15D Engine," NASA/CR-2002-211430, 2002.

ASTM International, ASTM E1050-10, "Standard Test Method for Impedance and Absorption of Acoustical Materials Using a Tube, Two Microphones and a Digital Frequency Analysis System," American Society for Testing Materials, 12 pages, Philadelphia, PA 1998.

Kinsler, et al., "Fundamentals of Acoustics," Chapter 9, pp. 200-245, John Wiley & Sons, Inc., New York, U.S. 2000.

Herschel, J.F.W., "On the absorption of light by coloured media, viewed in connexion with the undulatory theory," Philosophical Magazine and Journal of Science, 3, pp. 401-412, 1833.

Quincke, G. "Annalen Der Physik Und Chemie. Band CXVIII." 128, pp. 177-192, 1866.

Schuhmacher, A. et al., "Modeling of Horn-Type Loudspeakers for Outdoor Sound Reinforcement Systems," Applied Acoustics, 56, pp. 25-37, 1999.

Alfredson, R.J., "The Propagation of Sound in a Circular Duct of Continuously Varying Cross-Sectional Area," Journal of Sound and Vibration, 23, pp. 433-442, 1972.

Cummings, A., Sound Transmission in Curved Duct Bends, Journal of Sound and Vibration, 35, pp. 451-477, 1974.

Firth, D., et al., "Acoustic Characteristics of Circular Bends in Pipes," Journal of Sound and Vibration, 97, pp. 287-303, 1987.

* cited by examiner

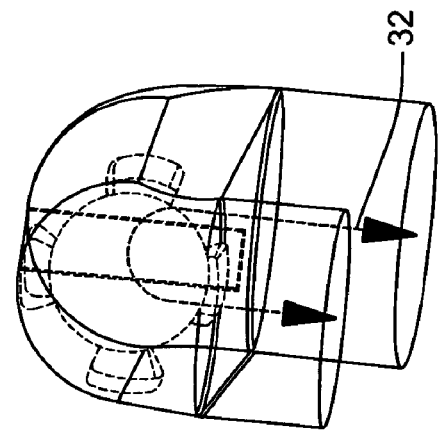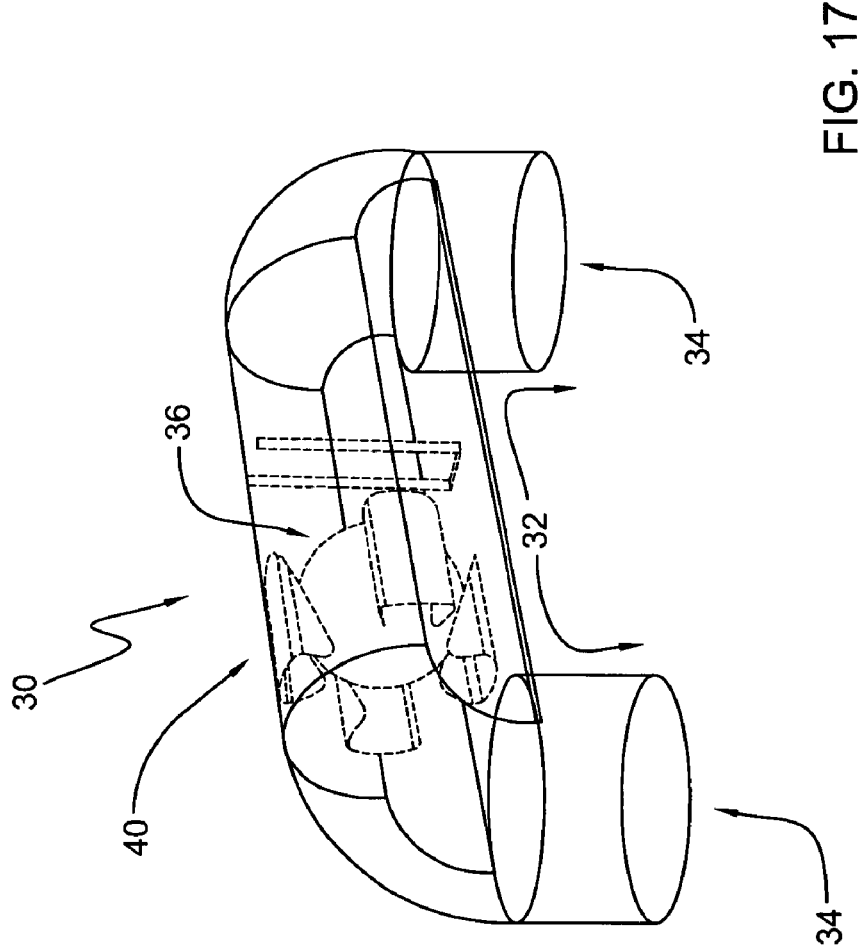
FIG. 17

NOISE CONTROLLED TURBINE ENGINE WITH AIRCRAFT ENGINE ADAPTIVE NOISE CONTROL TUBES

CROSS REFERENCE

This application claims the benefit of, and incorporates by reference, U.S. Provisional Patent Application No. 60/914,208 filed on Apr. 26, 2007.

FIELD OF THE INVENTION

The invention relates to the field of turbine engines with minimized noise. The invention relates to the field of methods/systems for reducing aircraft turbine engine noise. More particularly the invention relates to the field of controlling noise in turbine engines with adaptive noise control tubes.

SUMMARY OF THE INVENTION

In an embodiment the invention includes an aircraft turbine engine. The aircraft engine preferably has at least a takeoff fan speed and a landing fan speed. The aircraft engine includes a fan duct with at least a first HQ (Herschel-Quincke) acoustic control noise reduction tube, the acoustic control noise reduction tube having a fixed tube path between a tube entrance end and a distal tube exit end, the tube having a nonobstructive frequency $f_{no}$. The acoustic control noise reduction tube preferably contains at least a first movable frequency tuner obstruction. The movable frequency tuner obstruction is movable within the tube, preferably with the movable frequency tuner obstruction movable along the tube path between a first takeoff frequency obstruction tube path location, and an at least a second landing frequency obstruction tube path location, with the frequency tuner obstruction positioned at the first takeoff frequency location with the takeoff speed, and the frequency tuner obstruction positioned at the second landing frequency location with the landing speed.

In an embodiment the invention includes an aircraft noise reduction system for an aircraft engine having a plurality of aircraft engine operating speeds including a takeoff speed and a landing speed. The aircraft engine preferably including a fan duct with at least a first acoustic control noise reduction tube, the acoustic control noise reduction tube preferably having a fixed non variable tube path length between a tube entrance end and a distal tube exit end, with the acoustic control noise reduction tube path having a nonobstructive frequency $f_{no}$. The acoustic control noise reduction tube contains at least a first movable frequency tuner obstruction ball, the movable frequency tuner obstruction ball movable along the tube path between a first takeoff frequency obstruction tube path ball location, and an at least second landing frequency obstruction tube path ball location, the frequency tuner ball positioned at the first takeoff frequency ball location with the takeoff speed, and the frequency tuner ball positioned at the second landing frequency location with the landing speed wherein the movable frequency tuner ball location along the tube path reduces noise generated by the aircraft engine operating at the aircraft engine operating speeds.

In an embodiment the invention includes a vehicle noise reduction system for a vehicle having troublesome noisy oscillations in gas pressure. The vehicle noise reduction system including at least a first HQ (Herschel-Quincke) acoustic control noise reduction tube, the acoustic control noise reduction tube having a fixed nonvariable path length tube path between a tube entrance end and a distal tube exit end. The acoustic control noise reduction tube preferably containing at least a first movable frequency tuner obstruction, the movable frequency tuner obstruction movable within the tube path between a first frequency obstruction tube path ball location, and at least a second frequency obstruction tube path ball location, with the frequency tuner obstruction positioned at the first frequency location for a first operation speed noise reduction of a first troublesome noise oscillation, the frequency tuner obstruction positioned at the second frequency location for a second operation speed noise reduction of a second troublesome noise oscillation, wherein the movable frequency tuner location reduces noise generated by the oscillations in gas pressure while operating at a plurality of operating speeds.

In an embodiment the invention includes a noise reduction system for a gas mover having a plurality of operating speeds including a first speed, and at least a second speed. Preferably the gas mover has a plurality of operation modes, preferably a plurality of operation speeds, with the noise reduction system including a gas moving duct with at least a first HQ acoustic control noise reduction tube. Preferably the acoustic control noise reduction tube has a tube path between a tube entrance end and a distal tube exit end, preferably with a fixed non variable tube path length. The acoustic control noise reduction tube contains at least a first movable frequency tuner obstruction, the movable frequency tuner obstruction movable within the tube path between a first operating speed frequency obstruction tube path location, and at least a second operating speed frequency obstruction tube path location. The frequency tuner obstruction is preferably positioned at the first frequency location with the first operating speed, the frequency tuner obstruction positioned at the second frequency location with the second operating speed, wherein the movable frequency tuner location within the tube path reduces noise generated by the gas mover operating at the plurality of operating speeds.

In an embodiment the invention includes a method of reducing noise in a machine having a plurality of troublesome noise frequencies and a plurality of operation modes. The method includes providing a machine having a first operation mode with a first operation mode noise, the machine having at least a second operation mode with a second operation mode noise. The method includes providing a noise reduction system having at least a first acoustic control noise reduction tube, the acoustic control noise reduction tube having a tube path between a tube entrance end and a distal tube exit end, the acoustic control noise reduction tube containing a movable frequency tuner obstruction, the movable frequency tuner obstruction movable within the tube path between a first operation mode obstruction tube path first frequency location, and at least a second operation mode obstruction tube path second frequency location, the frequency tuner obstruction positioned at the first frequency location with the first operation mode, and the frequency tuner obstruction positioned at the second frequency location with the second operation mode wherein the movable frequency tuner obstruction tube path location reducing the noise generated by the machine operation modes.

In an embodiment the invention includes a method of reducing engine noise. The method includes providing an engine having a first pressure level from a first engine operation mode and at least a second pressure level from an at least second engine operation mode. The method includes providing at least a first noise reduction tube, the tube having a tube path between a tube entrance end and a distal tube exit end, the tube having an untuned natural tube frequency. The tube contains a movable frequency tuner, the movable frequency tuner movable between a first pressure position, and at least a second pressure frequency position, the frequency tuner positioned at the first frequency position with the first engine operation mode, and the frequency tuner positioned at the second frequency position with the second engine operation mode wherein the first frequency position and the at least second frequency position tune the natural tube frequency to inhibit a plurality of troublesome noises.

In an embodiment the invention includes an aircraft engine, the aircraft engine having a takeoff speed with a takeoff fan speed air pressure and a landing speed with a landing fan speed air pressure. The aircraft engine includes a fan duct with at least a first acoustic control tube, the tube having a fixed non variable tube path length between a tube entrance end and a distal tube exit end, the tube having a nonaltered untuned natural frequency $f_{no}$. The acoustic control tube contains at least a first movable frequency tuner, the movable frequency tuner movable between a first takeoff frequency position, and a second landing frequency position, the frequency tuner positioned at the first takeoff frequency position with the takeoff fan speed air pressure, the frequency tuner positioned at the second landing frequency position with the landing fan speed air pressure.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention and together with the description serve to explain the principals and operation of the invention.

BRIEF DESCRIPTION OF THE DRAWINGS

FIG. 17 illustrates an acceleration activated noise reduction tube with a moving frequency tuner obstruction ball in a takeoff location.

DETAILED DESCRIPTION OF THE PREFERRED EMBODIMENTS

Figure 1:
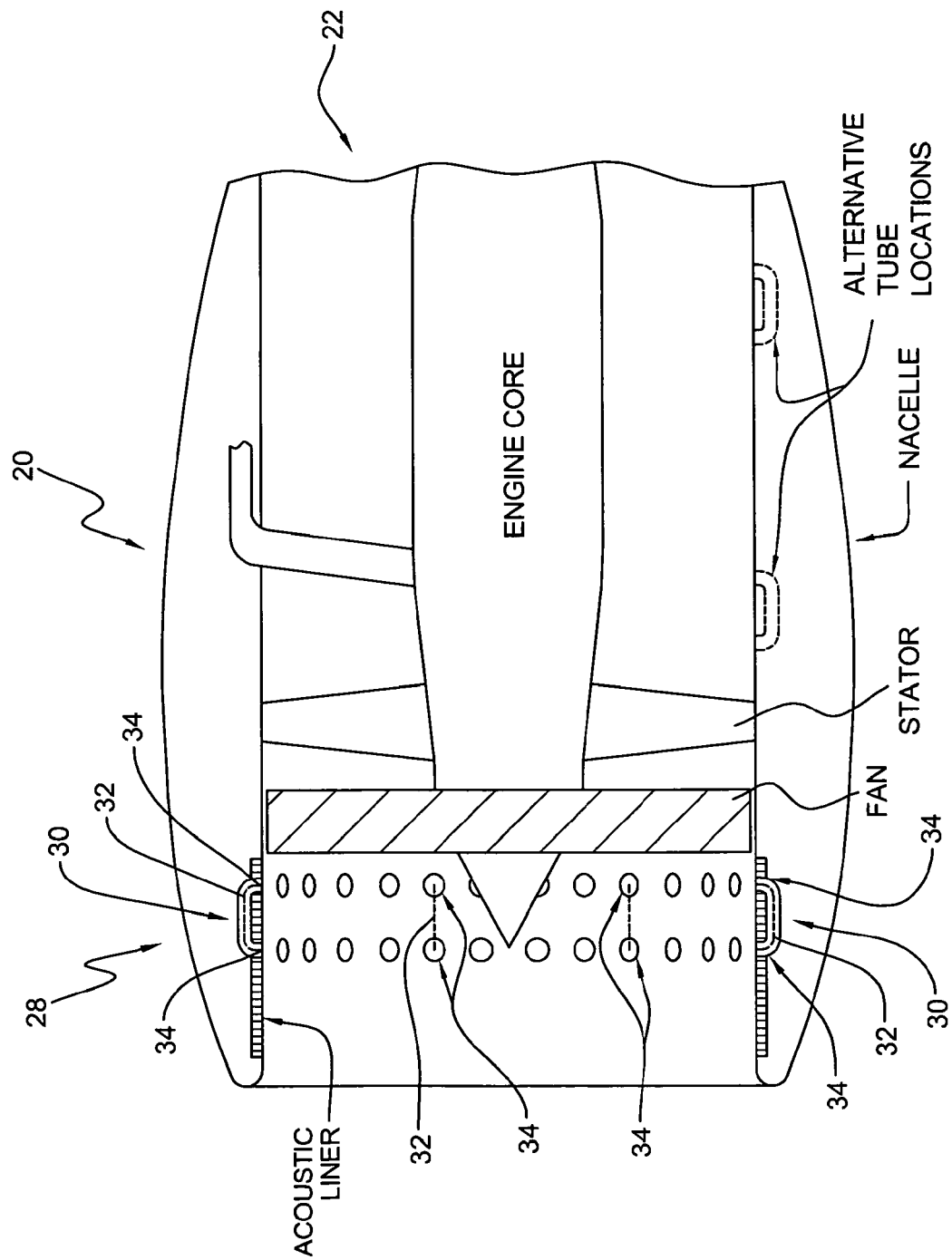
FIG. 1 illustrates an aircraft turbine engine with noise reduction tubes.
Figure 2:
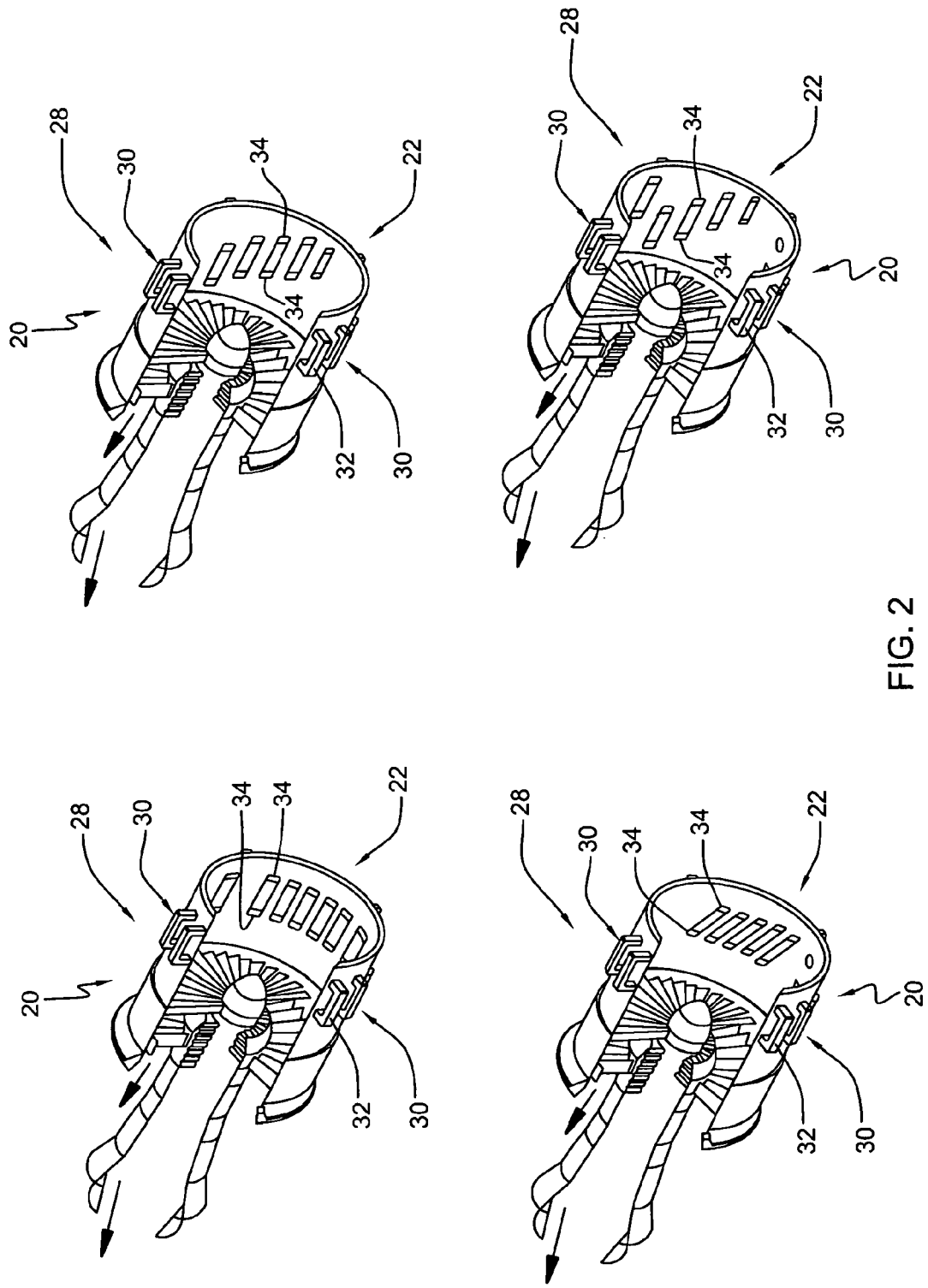
FIG. 2 illustrates aircraft turbine engines with noise reduction tubes.
Figure 3:
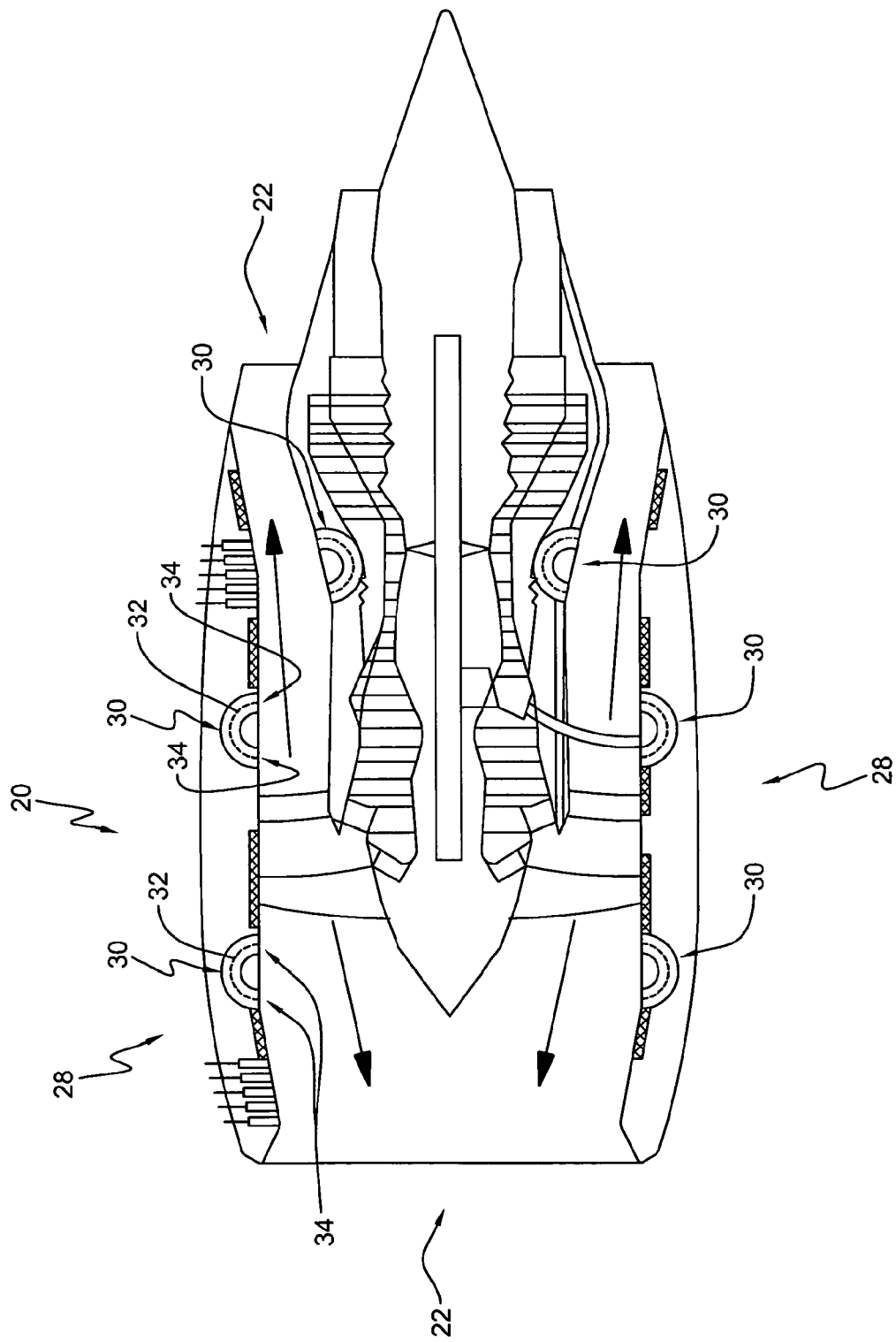
FIG. 3 illustrates an aircraft turbine engine with noise reduction tubes.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

In an embodiment the invention includes an aircraft turbine engine. The aircraft engine preferably has at least a takeoff fan speed and a landing fan speed. The aircraft engine includes a fan duct with at least a first HQ (Herschel-Quincke) acoustic control noise reduction tube, the acoustic control noise reduction tube having a fixed tube path between a tube entrance end and a distal tube exit end, the tube having a nonobstructive frequency $f_{no}$. The acoustic control noise reduction tube preferably contains at least a first movable frequency tuner obstruction. The movable frequency tuner obstruction is movable within the tube, preferably with the movable frequency tuner obstruction movable along the tube path between a first takeoff frequency obstruction tube path location, and an at least a second landing frequency obstruction tube path location, with the frequency tuner obstruction positioned at the first takeoff frequency location with the takeoff speed, and the frequency tuner obstruction positioned at the second landing frequency location with the landing speed.

In an embodiment the invention includes an aircraft turbine engine 20. Preferably the aircraft engine 20 has a takeoff fan speed and a landing fan speed, preferably with the turbine engine having a plurality of aircraft operational flight stages with corresponding engine speed operational stages. The aircraft engine 20 includes a fan duct 22 with at least a first HQ (Herschel-Quincke) acoustic control noise reduction tube 30, the tube 30 having a tube path between a tube entrance end and a distal tube exit end. The acoustic control noise reduction tube 30 tube path 32 is preferably a fixed nonvariable tube path length between the tube entrance end 34 and the distal tube exit end 34. The tube 30 preferably has a nonobstructive frequency $f_{no}$ when not obstructed. The tube 30 preferably contains at least a first movable frequency tuner ball obstruction 36 with the first movable frequency tuner obstruction 36 movable within the tube 30 between a plurality of tube path locations, preferably with the tube path locations varying from proximate a tube end 34 to distal from said same tube end 34. Preferably the movable frequency tuner ball obstruction 36 is movable along the tube path 32 between a first takeoff frequency obstruction tube path location, and an at least a second landing frequency obstruction tube path location with the frequency tuner obstruction positioned at the first takeoff frequency location with the takeoff speed and with the frequency tuner obstruction positioned at the second landing frequency location with the landing speed.

Figure 5:
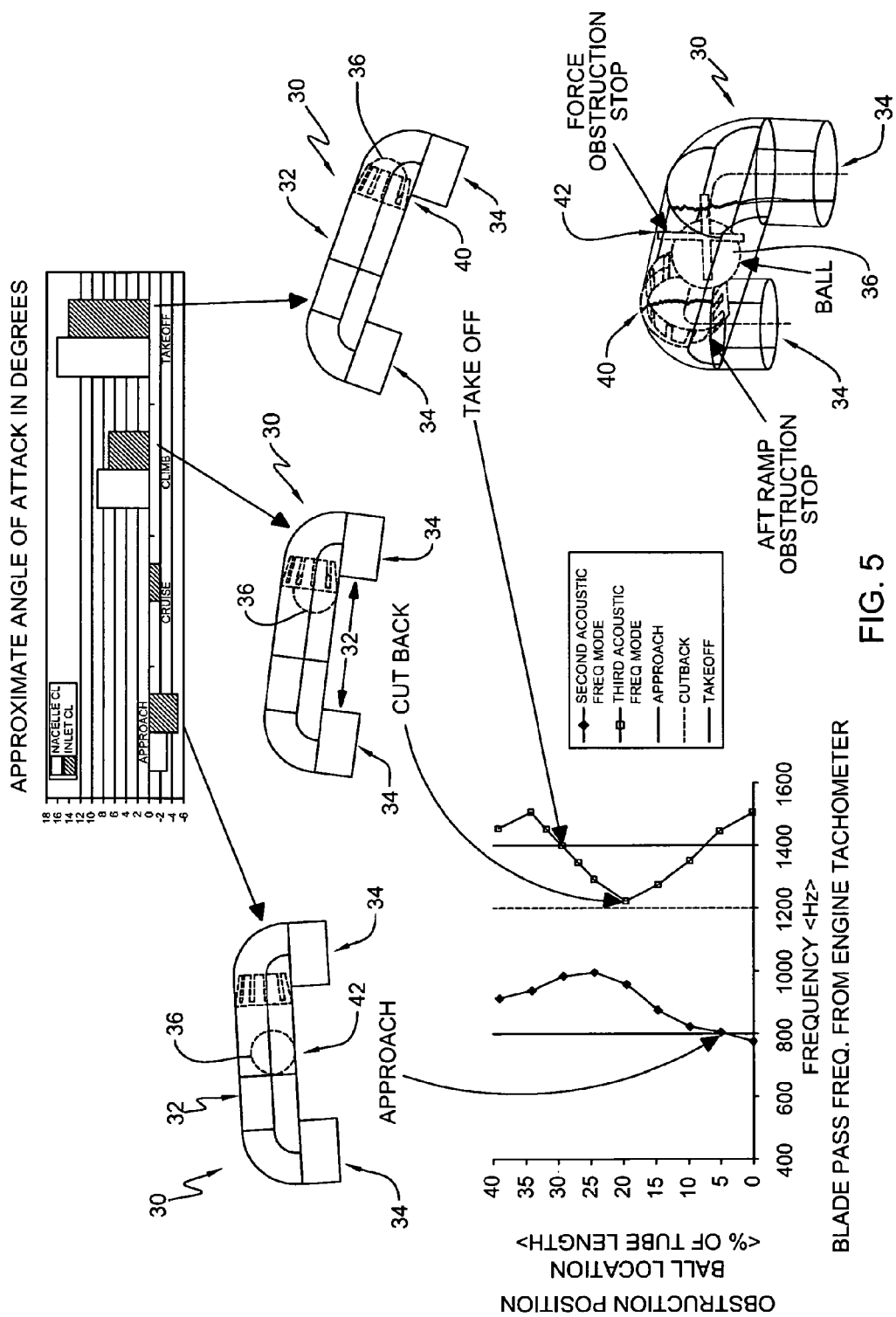
FIG. 5 illustrates a movable frequency tuner ball obstruction movement along a tunable path portion of a tube path acoustic control noise reduction tube at flight stages of an aircraft.
Figure 6:
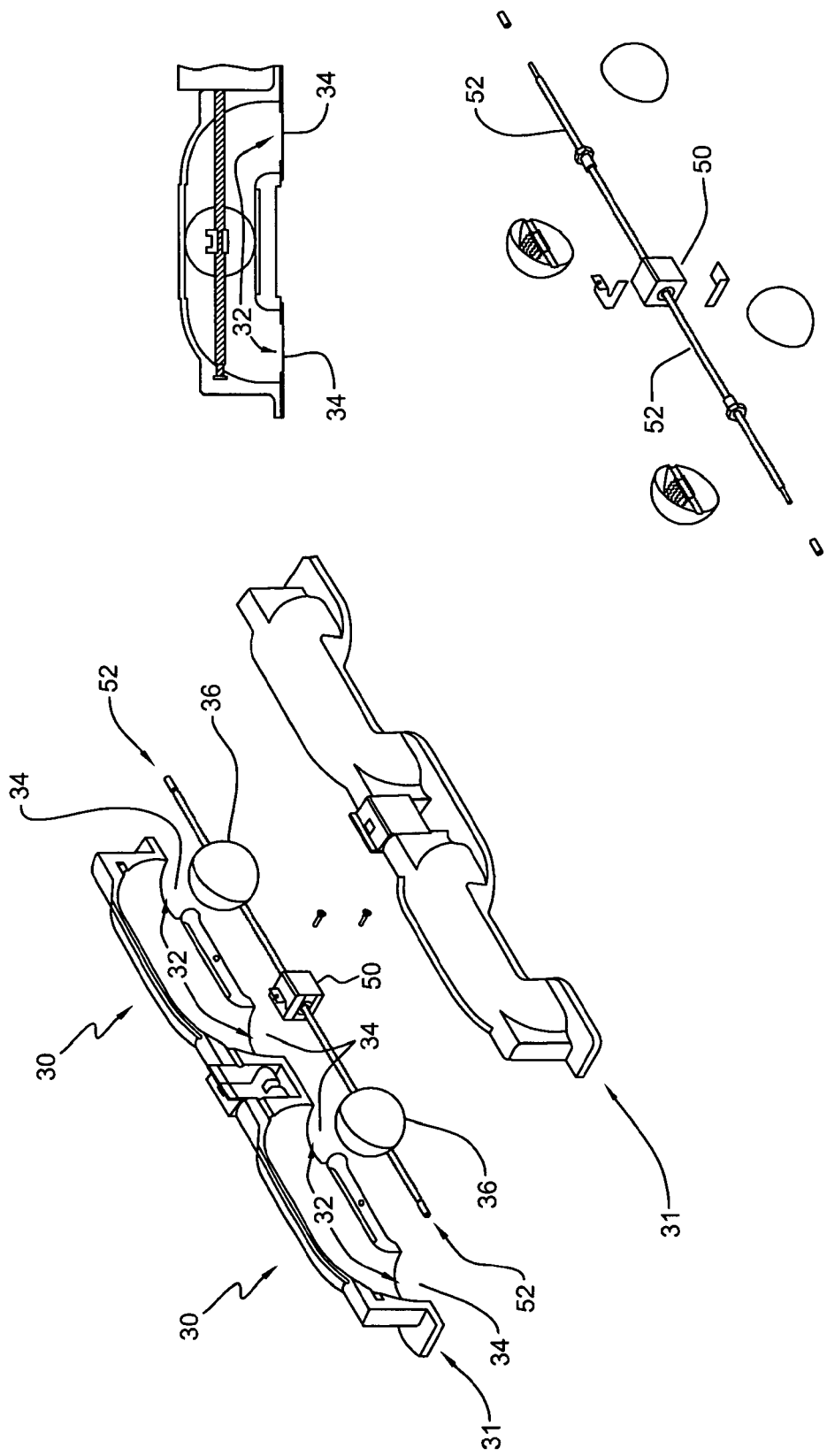
FIG. 6 illustrates assemblies of aligned fore and aft noise reduction tubes with a motor actuator ball mover for moving frequency tuner obstruction balls in the tubes.
Figure 7:
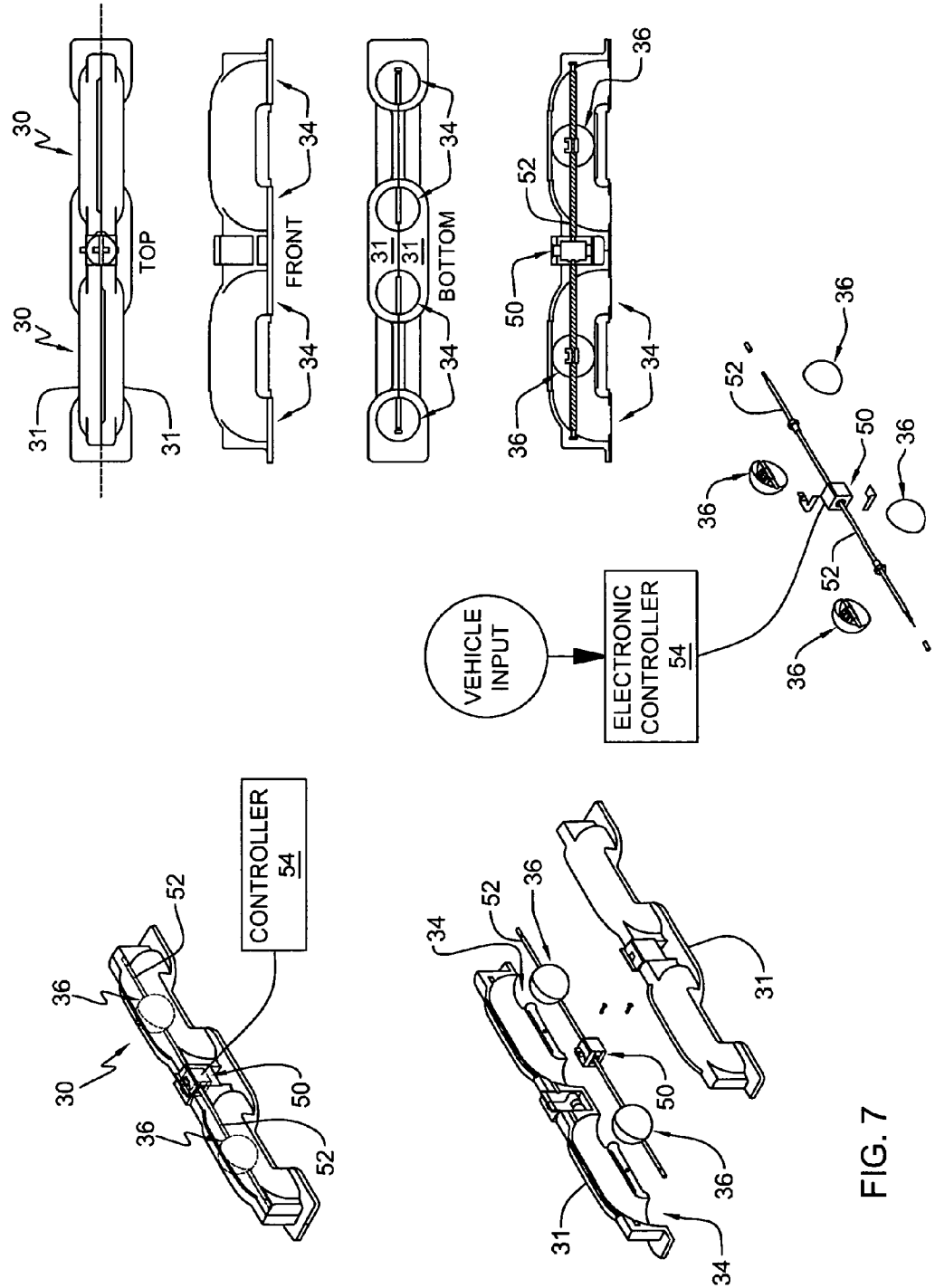
FIG. 7 illustrates assemblies of aligned fore and aft noise reduction tubes with a motor actuator ball mover for moving frequency tuner obstruction balls in the tubes.

In preferred embodiments such as shown in FIG. 5, the acoustic control noise reduction tube 30 contains a first movable frequency tuner obstruction ball 36 movable along a tunable path portion of the tube path 32 between tube path locations varying from aft locations proximate a tube exit end 34 to distal fore locations distal from the tube exit end 34 and proximate the tube entrance end 34. Preferably the movable frequency tuner ball obstruction 36 is movable along the tube path 32 between the first takeoff frequency obstruction tube path location 40, and an at least a second landing frequency obstruction tube path location 42 with the frequency tuner obstruction 36 positioned at the first takeoff frequency location 40 with the takeoff speed flight stage and with the frequency tuner obstruction 36 positioned at the second landing frequency location 42 with the landing speed approach flight stage. In preferred embodiments such as shown in FIG. 5 the movable frequency tuner obstruction ball 36 is naturally moved between the tube path locations by inertia and gravity. In preferred embodiments a plurality of acoustic control noise reduction tubes 30 are used together, preferably with at least a second acoustic control noise reduction tube oriented relative to the first tube, preferably with first and second acoustic control noise reduction tube aligned to provide a fore tube and aft tube. In preferred embodiments such as shown in FIG. 6-7, a pair of aligned tubes 30 provide fore and aft acoustic control noise reduction tubes 30 with tunable tube paths 32 between their fore entrance ends 34 and their aft exit ends 34. In preferred embodiments such as shown in FIG. 6-7, a pair of aligned tubes 30 provide fore and aft acoustic control noise reduction tubes 30 with tunable tube paths 32 between their fore entrance ends 34 and their aft exit ends 34, with the tubes tunable by the movable frequency tuner obstruction balls 36 which are moved along the paths 32 with a motor actuator ball mover 50. Preferably the position of the ball obstructions 36 along the tube path length 32 between the ends 34 tunes the tube's acoustic resonance frequency above and below $f_{no}$ to coincide with the blade pass frequency of the turbine engine fan spinning inside the fan duct 22. Preferably the obstruction 36 is positioned within the tube 30 to minimize and tune the tube impedance so as to maximize acoustic energy going through the tube 30. Preferably the acoustic control noise reduction tube 30 tube path 32 is a fixed nonvariable tube path length between the tube entrance end 34 and the distal tube exit end 34 with the path length between the entrance and exit ends 34 maintained with the structure of the tube inhibiting a change in such tube path length. Preferably the tuner ball obstruction 36 moves with the aircraft engine and flight operation aircraft transition between the aircraft flight operation modes. In preferred embodiments the tuner ball obstruction 36 is moved by the aircraft flight operation modes unbalanced motive forces, preferably with the ball moved by acceleration/inertia, preferably with the aircraft takeoff and landing motions and gravity moving the ball obstruction. As shown in FIG. 5, aircraft operation takeoff acceleration, gravity, and attitude move and position the ball obstruction at first takeoff frequency obstruction tube path location 40, then a cut back flight stage acceleration/inertia, gravity, attitude move and position ball obstruction to an intermediary cutback frequency obstruction tube path location, then approach transition to the aircraft landing flight stage acceleration/inertia, gravity, and attitude move and position ball obstruction to the second landing frequency obstruction tube path location 42. As shown in FIG. 5 at takeoff the inertia of the ball and the forward acceleration of the aircraft along with gravity and the upward sloping orientation of the tube locates the ball at the takeoff tube path location 40, preferably with the location having a ball receiver, such as the aft ramp obstruction stop. As shown in FIG. 5 at approach the inertia of the ball and the deceleration of the aircraft along with gravity and the downward sloping orientation of the tube locates the ball at the approach tube path location 42, preferably with the location having a ball stop, such as the fore obstruction stop. Preferably the movement of obstruction 36 provides a frequency change of at least ±10%. Preferably the acoustic control noise reduction tube 30 has a tube cross-section area and the tuner obstruction ball having a tuner obstruction cross-section area wherein the tuner obstruction cross-section area is greater than 50% of the tube cross-section area, preferably ≧75% of the tube cross-section area, ≧80% of the tube cross-section area, ≧85% of the tube cross-section area. Preferably the tuner obstruction cross-section area is no greater than 99% of the tube cross-section area, preferably ≦99% of the tube cross-section area, preferably ≦98% of the tube cross-section area, preferably ≦95% of the tube cross-section area, preferably ≦90% of the tube cross-section area. Preferably the tuner ball obstruction cross-section area is in the range between 50 and 99% of the tube cross-section area, preferably in the range between 75-95% of the tube cross-section area, preferably in the range between 85-90% of the tube cross-section area.

In preferred embodiments the aircraft turbine engine noise reduction system the movable frequency tuner obstruction 36 is a rolling ball obstruction with the rolling ball obstruction rolling to the frequency tuning obstruction tube path locations. In a preferred embodiment the movable frequency tuner obstruction 36 is spherical, preferably a spherical ball. In a preferred embodiment the movable frequency tuner obstruction 36 has a smooth curved outer surface. In an alternative preferred embodiment the movable frequency tuner obstruction 36 is nonspherical, preferably oblong with a smooth curved outer surface, preferably an oblong football shape with cutoff ends. In preferred embodiments the aircraft turbine engine noise reduction system the movable frequency tuner obstruction 36 is a hollow ball. In preferred embodiments the aircraft turbine engine noise reduction system the movable frequency tuner obstruction 36 is a highly damped elastomeric ball, preferably comprised of silicon. In preferred embodiments the aircraft turbine engine noise reduction system the movable frequency tuner obstruction 36 is a hollow ball with fluid inside the ball. In preferred embodiments the aircraft turbine engine noise reduction system includes a ball obstruction mover actuator 50, preferably a motor for moving the movable frequency tuner obstruction along the tube path.

In an embodiment the invention includes an aircraft noise reduction system for an aircraft engine having a plurality of aircraft engine operating speeds including a takeoff speed and a landing speed. The aircraft engine preferably including a fan duct with at least a first acoustic control noise reduction tube, the acoustic control noise reduction tube preferably having a fixed non variable tube path length between a tube entrance end and a distal tube exit end, with the acoustic control noise reduction tube path having a nonobstructive frequency $f_{no}$. The acoustic control noise reduction tube contains at least a first movable frequency tuner obstruction ball, the movable frequency tuner obstruction ball movable along the tube path between a first takeoff frequency obstruction tube path ball location, and an at least second landing frequency obstruction tube path ball location, the frequency tuner ball positioned at the first takeoff frequency ball location with the takeoff speed, and the frequency tuner ball positioned at the second landing frequency location with the landing speed wherein the movable frequency tuner ball location along the tube path reduces noise generated by the aircraft engine operating at the aircraft engine operating speeds.

In an embodiment the invention includes an aircraft noise reduction system 28. The aircraft noise reduction system 28 preferably provides noise reduction for an aircraft engine turbine 20 having a plurality of aircraft engine operating speeds including a takeoff fan speed and a landing speed for aircraft flight stages. The aircraft engine 20 includes a fan duct 22 with at least a first HQ (Herschel-Quincke) acoustic control noise reduction tube 30. The acoustic control noise reduction tubes 30 having a fixed non variable tube path length tube path 32 between a tube entrance end 34 and a distal tube exit end 34, with the acoustic control noise reduction tube having a nonobstructive frequency $f_{no}$. The acoustic control noise reduction tube 30 contains at least a first movable frequency tuner ball obstruction 36. The movable frequency tuner ball obstruction movable along the tube path between a first takeoff frequency obstruction tube path ball location, and an at least second landing frequency obstruction tube path ball location. The frequency tuner ball obstruction is positioned at the first takeoff frequency ball location 40 with the takeoff speed, and the frequency tuner obstruction ball is positioned at the second landing frequency location 42 with the landing speed wherein the movable frequency tuner ball location along the tube path reduces noise generated by the aircraft engine operating at the aircraft engine operating speeds. Preferably the position of obstruction 36 within the tube and along the tube path length tunes the tube acoustic resonance frequency above and below $f_{no}$ to coincide with the blade pass frequency of the fan spinning inside the fan duct 22. Preferably the obstruction 36 is positioned within the tube to tune and minimize tube impedance so a maximized acoustic energy goes through the tube 30. Preferably the tube path length of tube 30 between entrance 34 and exit 34 is maintained, with the system 28 and tube structure inhibiting changing of the tube path length. Preferably the obstruction 36 is moved by the aircraft transition between the aircraft flight stages, preferably with obstruction movement provided by unbalanced motive force from aircraft flight stage transitions. Preferably the obstruction 36 is moved by aircraft vehicle acceleration and gravity, preferably with aircraft motion and gravity moving the ball obstruction 36 along the tube 30. Preferably the ball obstruction 36 is a rolling ball with takeoff acceleration, gravity, and attitude moving and positioning the ball obstruction at the takeoff frequency obstruction tube path location 40, then with a cutback speed flight stage location, then followed with the transition to approach aircraft flight stage acceleration/inertia, gravity, and attitude moving and positioning the ball obstruction 36 to the approach frequency obstruction tube path location 42. Preferably the movement of obstruction 36 provides a frequency change of at least ±10%. Preferably the acoustic control noise reduction tube 30 has a tube cross-section area and the tuner obstruction ball 36 has a tuner obstruction cross-section area wherein the tuner obstruction cross-section area is greater than 50% of the tube cross-section area, preferably ≧75% of the tube cross-section area, ≧80% of the tube cross-section area, ≧85% of the tube cross-section area. Preferably the tuner obstruction cross-section area is no greater than 99% of the tube cross-section area, preferably ≦99% of the tube cross-section area, preferably ≦98% of the tube cross-section area, preferably ≦95% of the tube cross-section area, preferably ≦90% of the tube cross-section area. Preferably the tuner ball obstruction cross-section area is in the range between 50 and 99% of the tube cross-section area, preferably in the range between 75-95% of the tube cross-section area, preferably in the range between 85-90% of the tube cross-section area. In a preferred embodiment the aircraft noise reduction system 28 includes a motor 50 for moving the movable frequency tuner ball 36 along the tube path 32, preferably with a threaded rotating drive shaft between the motor and the ball to provide motor controlled movement of the obstruction 36 to the frequency tuning tube path locations. Preferably the noise reduction system 28 includes a plurality of acoustic control noise reduction tubes 30, preferably including first and second HQ acoustic control noise reduction tubes 30, with the second acoustic control noise reduction tube 30 aligned with the first acoustic control noise reduction tube 30, with a second tube fixed non variable tube path length tube path between second tube entrance end 34 and second tube distal tube exit end 34, the acoustic control noise reduction second tube containing a second tube movable frequency tuner ball obstruction 36, the second tube movable frequency tuner ball obstruction 36 movable along the second tube path between a second tube first takeoff frequency obstruction tube path ball location 40, and a second tube second landing frequency obstruction tube path ball location 42, the second tube frequency tuner ball obstruction 36 positioned at the second tube first takeoff frequency ball location 40 with the takeoff speed, and the second tube frequency tuner obstruction ball positioned at the second tube second landing frequency location 42 with the landing speed wherein the second tube movable frequency tuner ball location along the second tube path reducing noise generated by the aircraft engine operating at the aircraft engine operating speeds along with the first tube movable frequency tuner ball location along the first tube path reducing noise generated by the aircraft engine. Preferably the first acoustic control noise reduction tube 30 is a first fore acoustic control noise reduction tube and the aligned second acoustic control noise reduction tube 30 is a second aft acoustic control noise reduction tube. In a preferred embodiment a ball moving motor 50 is provided, preferably with the ball moving motor 50 moving both the first fore tube movable frequency tuner ball 36 and the second aft tube movable frequency tuner ball 36.

Preferably the ball moving motor 50 is mounted between the first fore acoustic control noise reduction tube 30 and the second aft acoustic control noise reduction tube 30, preferably with a ball moving drive shaft connection 52 between the motor and the tuner ball obstructions 36. In preferred embodiments the ball 36 is moved by an aircraft transition between a plurality of aircraft flight stages, preferably with the ball moved with unbalanced motive forces, preferably with the ball moved by the acceleration/inertia, aircraft motion and gravity that the ball and the aircraft experience during operation of the aircraft. Preferably the ball obstruction 36, is positioned by the takeoff acceleration, gravity, attitude experienced during such takeoff stage operation of the aircraft with the at the ball obstruction position first takeoff frequency obstruction tube path location 40. Preferably then the cut back transition acceleration/inertia, gravity, and attitude position the ball obstruction 36 to an intermediate cutback flight stage position frequency obstruction tube path location. Preferably then the landing approach transition to landing operation aircraft flight stage approach acceleration/inertia, gravity, attitude position the ball obstruction 36 to the landing frequency obstruction tube path location 42. Preferably the obstruction balls in the plurality of tubes are moved by the aircraft transition between the plurality of aircraft flight stages. Preferably a takeoff obstruction position is provided for takeoff and an approach landing obstruction position is provided for landing approach. Preferably the movable frequency tuner obstruction has a smooth curved outer surface. Preferably the movable frequency tuner obstruction is spherical.

In an embodiment the invention includes a vehicle noise reduction system for a vehicle having troublesome noisy oscillations in gas pressure. The vehicle noise reduction system including at least a first HQ (Herschel-Quincke) acoustic control noise reduction tube, the acoustic control noise reduction tube having a fixed nonvariable path length tube path between a tube entrance end and a distal tube exit end. The acoustic control noise reduction tube preferably containing at least a first movable frequency tuner obstruction, the movable frequency tuner obstruction movable within the tube path between a first frequency obstruction tube path ball location, and at least a second frequency obstruction tube path ball location, with the frequency tuner obstruction positioned at the first frequency location for a first operation speed noise reduction of a first troublesome noise oscillation. The frequency tuner obstruction positioned at the second frequency location for a second operation speed noise reduction of a second troublesome noise oscillation, wherein the movable frequency tuner location reduces noise generated by the oscillations in gas pressure while operating at a plurality of operating speeds.

In an embodiment the vehicle noise reduction system 28 for a vehicle having troublesome noisy oscillations in gas pressure includes at least a first acoustic control noise reduction tube 30. Preferably the vehicle noise reduction system 28 controls noise from moving vehicle moving gas oscillations, preferably periodic oscillations in pressure of a gas. Preferably the vehicle noise reduction system 28 controls noise from moving vehicle moving gas oscillation including vehicle air gas opening opened to the surrounding environment atmosphere. Preferably the vehicle noise reduction system 28 controls noise from moving vehicle moving gas oscillation fan ducts. Preferably the vehicle noise reduction system 28 controls noise from moving vehicle motive power generators. Preferably the vehicle noise reduction system acoustic control noise reduction tube 30 has a fixed nonvariable path length tube path between a tube entrance end 34 and a distal tube exit end 34, preferably with the acoustic control noise reduction tube having a nonobstructive frequency $f_{no}$. Preferably the acoustic control noise reduction tube contains a first movable frequency tuner ball obstruction 36, the movable frequency tuner ball obstruction 36 movable along the tube path 32 between a first frequency obstruction tube path ball location 40, and at least a second frequency obstruction tube path ball location 42. Preferably the system includes at least a third frequency obstruction tube path ball location. The frequency tuner ball obstruction 36 is positioned at the first frequency ball location 40 for a first operation speed noise reduction of a first troublesome noise oscillation, and the frequency tuner obstruction ball 36 is positioned at the second frequency location 42 for a second operation speed noise reduction of a second troublesome noise oscillation. Preferably the frequency tuner obstruction 36 is positioned at a third intermediate frequency location with an intermediate operation speed noise reduction operation mode. The movable frequency tuner ball location along the tube path reduces noise generated by the oscillations in gas pressure while operating at the plurality of operating speeds. The position of obstruction 36 along the tube path length tunes the tube acoustic resonance frequency above and below $f_{no}$ to preferably coincide with the fan blade pass frequency of the gas moving fan. Preferably the obstruction is positioned to tune the tube impedance to a minimal impedance level for the operation mode noise so as to maximize the operation mode noise acoustic energy going through the tube. Preferably the tube path length between the tube entrance and exit is maintained, with the system inhibiting changing the tube path length. Preferably the obstruction is moved by the aircraft transitions between the aircraft vehicle flight stages, preferably with unbalanced motive forces. Preferably the movement of obstruction provides a frequency change of at least ±10%. Preferably the noise reduction system acoustic control noise reduction tube 30 has a tube cross-section area and the tuner obstruction ball 36 has a tuner obstruction cross-section area wherein the tuner obstruction cross-section area is greater than 50% of the tube cross-section area, preferably $\geq 75\%$ of the tube cross-section area, $\geq 80\%$ of the tube cross-section area, $\geq 85\%$ of the tube cross-section area. Preferably the tuner obstruction cross-section area is no greater than 99% of the tube cross-section area, preferably $\leq 99\%$ of the tube cross-section area, preferably $\leq 98\%$ of the tube cross-section area, preferably $\leq 95\%$ of the tube cross-section area, preferably $\leq 90\%$ of the tube cross-section area. Preferably the tuner ball obstruction cross-section area is in the range between 50 and 99% of the tube cross-section area, preferably in the range between 75-95% of the tube cross-section area, preferably in the range between 85-90% of the tube cross-section area. In a preferred embodiment the noise reduction system includes a motor 50 for moving the movable frequency tuner ball along the tube path, preferably with a threaded rotating drive shaft between the motor and the ball. In a preferred embodiment the noise reduction system includes a second HQ acoustic control noise reduction tube, the second acoustic control noise reduction tube aligned with the first acoustic control noise reduction tube and having a second tube fixed non variable tube path length tube path between a second tube entrance end and a second tube distal tube exit end, the acoustic control noise reduction second tube containing a second tube movable frequency tuner ball obstruction, the second tube movable frequency tuner ball obstruction movable along the second tube path between a second tube first takeoff frequency obstruction tube path ball location, and a second tube landing frequency obstruction tube path ball location, the second tube frequency tuner ball obstruction positioned at the second tube first takeoff frequency ball location with the takeoff speed, and the second tube frequency tuner obstruction ball positioned at the second tube landing frequency location with the landing speed wherein the second tube movable frequency tuner ball location along the second tube path reducing noise generated by the aircraft engine operating at the aircraft engine operating speeds. Preferably the system acoustic control noise reduction tubes include a tube cutback frequency obstruction tube path ball location, with the second tube frequency tuner obstruction ball positioned at the tube cutback frequency location with the aircraft engine operating cutback speed. Preferably the first HQ acoustic control noise reduction tube is a first fore acoustic control noise reduction tube 30 and the second acoustic control noise reduction tube is a second aft acoustic control noise reduction tube 30. In a preferred embodiment a ball moving motor is used to position the obstruction ball, preferably with the ball moving motor moving both the first fore tube movable frequency tuner ball and the second aft tube movable frequency tuner ball. Preferably the ball moving motor 50 is mounted between first fore acoustic control noise reduction tube and the second aft acoustic control noise reduction tube. Preferably the ball 36 is moved by a vehicle transition between a plurality of operational stages.

An embodiment the invention includes a noise reduction system for a gas mover having a plurality of operating speeds including a first speed, and at least a second speed. Preferably the gas mover has a plurality of operation modes, preferably a plurality of operation speeds, with the noise reduction system including a gas moving duct with at least a first HQ acoustic control noise reduction tube. Preferably the acoustic control noise reduction tube has a tube path between a tube entrance end and a distal tube exit end, preferably with a fixed non variable tube path length. The acoustic control noise reduction tube contains at least a first movable frequency tuner obstruction, the movable frequency tuner obstruction movable within the tube path between a first operating speed frequency obstruction tube path location, and at least a second operating speed frequency obstruction tube path location. The frequency tuner obstruction is preferably positioned at the first frequency location with the first operating speed, the frequency tuner obstruction positioned at the second frequency location with the second operating speed, wherein the movable frequency tuner location within the tube path reduces noise generated by the gas mover operating at the plurality of operating speeds.

In an embodiment the noise reduction system 28 is a gas mover noise reduction system for a gas mover 20. Preferably the gas mover noise reduction system controls noise for an air moving fan with gas oscillations, preferably a turbine having a plurality of engine operating speeds. Preferably the gas mover noise reduction system 28 is integrated with a gas mover 20 having a plurality of operation mode speeds, preferably including a high fan speed, a medium fan speed, and a low fan speed. Preferably the noise reduction system includes a gas moving fan duct 22 with at least a first acoustic control noise reduction tube 30, the acoustic control noise reduction tube 30 having a fixed non variable tube path length tube path 32 between a tube entrance end 34 and a distal tube exit end 34, with the acoustic control noise reduction tube having a nonobstructive frequency $f_{no}$. Preferably the acoustic control noise reduction tube 30 contains at least a first movable frequency tuner ball obstruction 36, the movable frequency tuner ball obstruction 36 movable along the tube path between a first operating speed frequency obstruction tube path ball location 40, and at least a second operating speed frequency obstruction tube path ball location 42. Preferably at least a third intermediate frequency obstruction tube path ball location is provided. The frequency tuner ball obstruction 36 is positioned at the first frequency takeoff ball location 40 with the high fan operating speed, the frequency tuner obstruction ball positioned at the second frequency approach location with the low fan operating speed. Preferably the frequency tuner obstruction ball is positioned at the intermediate frequency location with the medium speed. The movable frequency tuner ball location along the tube path reduces the noise generated by the gas mover operating at the at least two operating speeds for the takeoff and landing operations. The position of obstruction 36 along the tube path length tunes the tube acoustic resonance frequency above and below $f_{no}$ to preferably coincide with the fan blade pass frequency of the gas moving fan. Preferably the obstruction is positioned to tune the tube impedance to a minimal impedance level for the operation mode noise so as to maximize the operation mode noise acoustic energy going through the tube. Preferably the tube path length between the tube entrance and exit is maintained, with the system inhibiting changing the tube path length. Preferably the obstruction is moved by the aircraft transitions between the aircraft flight stages, preferably with unbalanced motive forces. Preferably the movement of obstruction provides a frequency change of at least ±10%. Preferably the noise reduction system acoustic control noise reduction tube 30 has a tube cross-section area and the tuner obstruction ball 36 has a tuner obstruction cross-section area wherein the tuner obstruction cross-section area is greater than 50% of the tube cross-section area, preferably ≧75% of the tube cross-section area, ≧80% of the tube cross-section area, ≧85% of the tube cross-section area. Preferably the tuner obstruction cross-section area is no greater than 99% of the tube cross-section area, preferably ≦99% of the tube cross-section area, preferably ≦98% of the tube cross-section area, preferably ≦95% of the tube cross-section area, preferably ≦90% of the tube cross-section area. Preferably the tuner ball obstruction cross-section area is in the range between 50 and 99% of the tube cross-section area, preferably in the range between 75-95% of the tube cross-section area, preferably in the range between 85-90% of the tube cross-section area. In a preferred embodiment the noise reduction system includes a motor 50 for moving the movable frequency tuner ball along the tube path, preferably with a threaded rotating drive shaft between the motor and the ball. In a preferred embodiment the noise reduction system includes a second HQ acoustic control noise reduction tube, the second acoustic control noise reduction tube aligned with the first acoustic control noise reduction tube and having a second tube fixed non variable tube path length tube path between a second tube entrance end and a second tube distal tube exit end, the acoustic control noise reduction second tube containing a second tube movable frequency tuner ball obstruction, the second tube movable frequency tuner ball obstruction movable along the second tube path between a second tube first takeoff frequency obstruction tube path ball location, and a second tube landing frequency obstruction tube path ball location, the second tube frequency tuner ball obstruction positioned at the second tube first takeoff frequency ball location with the takeoff speed, and the second tube frequency tuner obstruction ball positioned at the second tube landing frequency location with the landing speed wherein the second tube movable frequency tuner ball location along the second tube path reducing noise generated by the aircraft engine operating at the aircraft engine operating speeds. Preferably the system acoustic control noise reduction tubes include a tube cutback frequency obstruction tube path ball location, with the second tube frequency tuner obstruction ball positioned at the tube cutback frequency location with the aircraft engine operating cruising speed. Preferably the first HQ acoustic control noise reduction tube is a first fore acoustic control noise reduction tube 30 and the second acoustic control noise reduction tube is a second aft acoustic control noise reduction tube 30. In a preferred embodiment a ball moving motor is used to position the obstruction ball, preferably with the ball moving motor moving both the first fore tube movable frequency tuner ball and the second aft tube movable frequency tuner ball. Preferably the ball moving motor 50 is mounted between first fore acoustic control noise reduction tube and the second aft acoustic control noise reduction tube. Preferably the ball 36 is moved by a vehicle transition between a plurality of operational stages. In a preferred embodiment the aircraft noise reduction system 28 includes a motor 50 for moving the movable frequency tuner ball 36 along the tube path 32, preferably with a threaded rotating drive shaft between the motor and the ball to provide motor controlled movement of the obstruction 36 to the frequency tuning tube path locations. Preferably the noise reduction system 28 includes a plurality of acoustic control noise reduction tubes 30, preferably including first and second HQ acoustic control noise reduction tubes 30, with the second acoustic control noise reduction tube 30 aligned with the first acoustic control noise reduction tube 30, with a second tube fixed non variable tube path length tube path between second tube entrance end 34 and second tube distal tube exit end 34, the acoustic control noise reduction second tube containing a second tube movable frequency tuner ball obstruction 36, the second tube movable frequency tuner ball obstruction 36 movable along the second tube path between a second tube first takeoff frequency obstruction tube path ball location 40, and a second tube second landing frequency obstruction tube path ball location 42, the second tube frequency tuner ball obstruction 36 positioned at the second tube first takeoff frequency ball location 40 with the takeoff speed, and the second tube frequency tuner obstruction ball positioned at the second tube second landing frequency location 42 with the landing speed wherein the second tube movable frequency tuner ball location along the second tube path reducing noise generated by the aircraft engine operating at the aircraft engine operating speeds along with the first tube movable frequency tuner ball location along the first tube path reducing noise generated by the aircraft engine. Preferably the first acoustic control noise reduction tube 30 is a first fore acoustic control noise reduction tube and the aligned second acoustic control noise reduction tube 30 is a second aft acoustic control noise reduction tube. In a preferred embodiment a ball moving motor 50 is provided, preferably with the ball moving motor 50 moving both the first fore tube movable frequency tuner ball 36 and the second aft tube movable frequency tuner ball 36. Preferably the ball moving motor 50 is mounted between the first fore acoustic control noise reduction tube 30 and the second aft acoustic control noise reduction tube 30, preferably with a ball moving drive shaft connection 52 between the motor and the tuner ball obstructions 36. In preferred embodiments the ball 36 is moved by an aircraft transition between a plurality of aircraft flight stages, preferably with the ball moved with unbalanced motive forces, preferably with the ball moved by the acceleration/inertia, aircraft motion and gravity that the ball and the aircraft experience during operation of the aircraft. Preferably the ball obstruction 36, is positioned by the takeoff acceleration, gravity, attitude experienced during such takeoff stage operation of the aircraft with the at the ball obstruction position first takeoff frequency obstruction tube path location 40. Preferably then the cut back transition to cut back cruising speed acceleration/inertia, gravity, and attitude position the ball obstruction 36 to an intermediate cutback flight stage position cutback frequency obstruction tube path location. Preferably then the landing approach transition to landing operation aircraft flight stage approach acceleration/inertia, gravity, attitude position the ball obstruction 36 to the landing frequency obstruction tube path location 42. Preferably the obstruction balls in the plurality of tubes are moved by the aircraft transition between the plurality of aircraft flight stages. Preferably a takeoff obstruction position is provided for takeoff and an approach landing obstruction position is provided for landing approach. Preferably the movable frequency tuner obstruction has a smooth curved outer surface. Preferably the movable frequency tuner obstruction is spherical.

An embodiment the invention includes a method of reducing noise in a machine having a plurality of troublesome noises and a plurality of operation modes. The method includes providing a machine having a first operation mode with a first operation mode noise, the machine having at least a second operation mode with a second operation mode noise. The method includes providing a noise reduction system having at least a first acoustic control noise reduction tube, the acoustic control noise reduction tube having a tube path between a tube entrance end and a distal tube exit end, the acoustic control noise reduction tube containing a movable frequency tuner obstruction, the movable frequency tuner obstruction movable within the tube path between a first operation mode obstruction tube path first frequency location, and at least a second operation mode obstruction tube path second frequency location, the frequency tuner obstruction positioned at the first frequency location with the first operation mode, and the frequency tuner obstruction positioned at the second frequency location with the second operation mode wherein the movable frequency tuner obstruction tube path location reducing the noise generated by the machine operation modes.

In an embodiment method of reducing noise in a machine having a plurality of troublesome noises and a plurality of operation modes, the machine is an aircraft vehicle. Preferably the method includes providing a machine having a first operation mode with a first operation mode noise, the machine having at least a second operation mode with a second operation mode noise. The method includes providing a noise reduction system 28 having at least a first acoustic control noise reduction tube 30, the acoustic control noise reduction tube preferably having a fixed non variable tube path length tube path between a tube entrance end 34 and a distal tube exit end 34. Preferably the acoustic control noise reduction tube 30 has a nonobstructive frequency $f_{no}$. The acoustic control noise reduction tube is provided with a movable frequency tuner obstruction ball 36, the movable frequency tuner ball obstruction 36 is movable within the tube, preferably with the obstruction movable along the tube path 32 between a first operation mode operating speed frequency obstruction tube path first frequency location 40, and at least a second operation mode operating speed frequency obstruction tube path second frequency location 42. The frequency tuner obstruction 36 is positioned at the first frequency location 40 with the first operation mode high fan operating speed. The frequency tuner obstruction 36 is positioned at the second frequency location 42 with the second operation mode landing approach low fan operating speed. Preferably the frequency tuner obstruction ball is positioned at an intermediate third frequency location with an intermediate speed. The movable frequency tuner obstruction location along the tube path reduces the noise generated by the machine operation modes, preferably with the frequency tuner obstruction positioned at the first frequency location 40 inhibiting the first operation mode noise and the frequency tuner obstruction positioned at the at least second frequency location 42 inhibiting the at least second operation mode noise. Preferably the method includes positionally tuning the system with the position of obstruction 36 along the tube path length tuning the tube acoustic resonance frequency above and below $f_{no}$, preferably with positionally tuning the resonance frequency to coincide with the blade pass frequency of the fan spinning inside the fan duct 22. Preferably the method includes positionally tuning the position of the obstruction to minimize tube impedance and maximize acoustic energy going through the tube 30. Preferably the tube path length of tube 30 between entrance 34 and exit 34 is maintained, with the method inhibiting change of the tube path length. Preferably the method provides for moving the obstruction 36 with a transition between the operation modes. Preferably unbalanced motive forces are used to move obstruction 36 with a transition between the operation modes, preferably with the obstruction 36 moved by acceleration/inertia, operation motion and gravity. Preferably the method includes providing for ball obstruction movement with acceleration, gravity, and attitude moving and positioning the ball obstruction at first frequency obstruction tube path location 40, then transition to an intermediate speed acceleration/inertia, gravity, attitude positioning the ball obstruction at an intermediate frequency obstruction tube path location, then transition to a further operation mode acceleration/inertia, gravity, attitude moving and positioning the ball obstruction to the frequency obstruction tube path location 42. Preferably positionally tuning movement of obstruction 36 provides a frequency change of at least ±10%.

Preferably the noise reduction system acoustic control noise reduction tube 30 is provided with a tube cross-section area and the tuner obstruction ball 36 is provided with a tuner obstruction cross-section area wherein the tuner obstruction cross-section area is greater than 50% of the tube cross-section area, preferably ≧75% of the tube cross-section area, ≧80% of the tube cross-section area, ≧85% of the tube cross-section area. Preferably the tuner obstruction cross-section area is no greater than 99% of the tube cross-section area, preferably ≦99% of the tube cross-section area, preferably ≦98% of the tube cross-section area, preferably ≦95% of the tube cross-section area, preferably ≦90% of the tube cross-section area. Preferably the tuner ball obstruction cross-section area is in the range between 50 and 99% of the tube cross-section area, preferably in the range between 75-95% of the tube cross-section area, preferably in the range between 85-90% of the tube cross-section area. In a preferred embodiment a motor 50 is provided for moving the movable frequency tuner ball along the tube path, preferably with a threaded rotating drive shaft between the motor and the ball. In a preferred embodiment a second HQ acoustic control noise reduction tube is provided with the second acoustic control noise reduction tube aligned with the first acoustic control noise reduction tube and having a second tube fixed non variable tube path length tube path between a second tube entrance end 34 and a second tube distal tube exit end 34, the acoustic control noise reduction second tube 30 containing a second tube movable frequency tuner ball obstruction 36, the second tube movable frequency tuner ball obstruction 36 movable along the second tube path between a second tube first takeoff frequency obstruction tube path ball location 40, and a second tube landing frequency obstruction tube path ball location 42, the second tube frequency tuner ball obstruction positioned at the second tube first takeoff frequency ball location 40 with the takeoff speed, and the second tube frequency tuner obstruction ball positioned at the second tube landing frequency location 42 with the landing speed wherein the second tube movable frequency tuner ball location along the second tube path reducing noise generated by the aircraft engine operating at the aircraft engine operating speeds. Preferably the first HQ acoustic control noise reduction tube is positioned as a first fore acoustic control noise reduction tube 30 and the second acoustic control noise reduction tube is positioned as a second aft acoustic control noise reduction tube 30. In a preferred embodiment the ball moving motor positions the obstruction ball 36, preferably with the ball moving motor 50 moving both the first fore tube movable frequency tuner ball 36 and the second aft tube movable frequency tuner ball 36. Preferably an electronic controller 54 controls the noise reduction system motor 50. Preferably a noise reduction system controller 54 controls a plurality of noise reduction system motors 50 for a plurality of noise reduction system tubes 30. Preferably a vehicle tach output is used as a noise reduction system controller input to provide an operation mode frequency obstruction position output for positioning the obstruction with the motor at the appropriate frequency obstruction tube path location. Preferably a vehicle tach frequency is used with a predetermined data matrix lookup table, preferably such that with a blade pass frequency engine tachometer frequency outputted from the vehicle operation is used to determine an obstruction position ball location result of the tube path with the controller controlling the motor 50 to position the ball obstruction at such determined obstruction position ball location. Preferably with a tach input into the controller, the controller looks up locations for the plurality of obstructions 36 in the plurality of tubes 30 and commands the plurality of motors 50 to respectively position at their respective looked up locations to inhibit vehicle noise at that tach inputted operation speed. Preferably the ball moving motor 50 is mounted between the first fore acoustic control noise reduction tube 30 and the second aft acoustic control noise reduction tube 30. Preferably the ball 36 is moved by a vehicle transition between a plurality of operational stages. In preferred embodiments the motor 50 is controlled for moving the movable frequency tuner ball 36 along the tube path 32, preferably with a threaded rotating drive shaft between the motor and the ball, to provide motor controlled movement of the obstruction 36 to the frequency tuning tube path locations. Preferably a plurality of acoustic control noise reduction tubes 30 are provided, preferably including first and second HQ acoustic control noise reduction tubes 30, with the second acoustic control noise reduction tube 30 aligned with the first acoustic control noise reduction tube 30, with a second tube fixed non variable tube path length tube path between second tube entrance end 34 and second tube distal tube exit end 34, the acoustic control noise reduction second tube containing a second tube movable frequency tuner ball obstruction 36, the second tube movable frequency tuner ball obstruction 36 movable along the second tube path between a second tube first takeoff frequency obstruction tube path ball location 40, and a second tube second landing frequency obstruction tube path ball location 42, the second tube frequency tuner ball obstruction 36 positioned at the second tube first takeoff frequency ball location 40 with the takeoff speed, and the second tube frequency tuner obstruction ball positioned at the second tube second landing frequency location 42 with the landing speed wherein the second tube movable frequency tuner ball location along the second tube path reducing noise generated by the aircraft engine operating at the aircraft engine operating speeds along with the first tube movable frequency tuner ball location along the first tube path reducing noise generated by the aircraft engine. Preferably the first acoustic control noise reduction tube 30 is a first fore acoustic control noise reduction tube and the aligned second acoustic control noise reduction tube 30 is a second aft acoustic control noise reduction tube. In a preferred embodiment the ball moving motor 50 moves both the first fore tube movable frequency tuner ball 36 and the second aft tube movable frequency tuner ball 36. Preferably the ball moving motor 50 is mounted between the first fore acoustic control noise reduction tube 30 and the second aft acoustic control noise reduction tube 30, preferably with a ball moving drive shaft 52 connecting the motor and the tuner ball obstructions 36. In preferred embodiments the ball 36 is provided in tube 30 for movement by an aircraft transition between a plurality of aircraft flight stages, preferably with the ball moved with unbalanced motive forces, preferably with the ball moved by the acceleration/inertia, aircraft motion and gravity that the ball and the aircraft experience during operation of the aircraft. Preferably the ball obstruction 36, is positioned by the takeoff acceleration, gravity, attitude experienced during such takeoff stage operation of the aircraft with the at the ball obstruction position first takeoff frequency obstruction tube path location 40. Preferably then the cut back transition to cut back cruising speed acceleration/inertia, gravity, and attitude position the ball obstruction 36 to an intermediate cutback flight stage position cruising frequency obstruction tube path location. Preferably then the landing approach transition to landing operation aircraft flight stage approach acceleration/inertia, gravity, attitude position the ball obstruction 36 to the landing frequency obstruction tube path location 42. Preferably the obstruction balls in the plurality of tubes are moved by the aircraft transition between the plurality of aircraft flight stages. Preferably a takeoff obstruction position is provided for takeoff and an approach landing obstruction position is provided for landing approach. Preferably the movable frequency tuner obstruction is provided with a smooth curved outer surface. Preferably the movable frequency tuner obstruction is provided with a rounded spherical outer surface. Preferably the movable frequency tuner obstruction is moved by transitions between operation modes.

An embodiment the invention includes a method of reducing engine noise. The method includes providing an engine having a first pressure level from a first engine operation mode and at least a second pressure level from an at least second engine operation mode. The method includes providing at least a first noise reduction tube, the tube having a tube path between a tube entrance end and a distal tube exit end, the tube having an untuned natural tube frequency. The tube contains a movable frequency tuner, the movable frequency tuner movable between a first pressure position, and at least a second pressure frequency position, the frequency tuner positioned at the first frequency position with the first engine operation mode, and the frequency tuner positioned at the second frequency position with the second engine operation mode wherein the first frequency position and the at least second frequency position tune the natural tube frequency to inhibit a plurality of troublesome noises.

In an embodiment of the method of reducing aircraft engine noise, the method includes providing an engine 20. Preferably the engine 20 has a high pressure high speed takeoff first pressure level from a first engine operation mode and at least a low pressure low speed landing approach speed second pressure level from an at least second engine operation mode. The method includes providing at least a first acoustic control tube 30, the tube preferably having a fixed non variable tube path 32 between a tube entrance end 34 and a distal tube exit end 34, with the tube having a nonaltered untuned natural tube frequency ($f_{no}$). The tube 30 preferably containing at least a first movable frequency tuner deformable wall diaphragm obstruction 36, the movable frequency tuner diaphragm obstruction movable between a first pressure takeoff frequency diaphragm obstruction position, and at least a second pressure frequency diaphragm obstruction position. Preferably the movable frequency tuner diaphragm obstruction is movable from an exterior position outside of the tube path structure to an interior position inside of the tube path structure. Preferably the movable frequency tuner deformable wall diaphragm obstruction 36 is comprised of a flexible material 56, preferably with the flexible material covering a tube opening in the tube inflexible structure between the first and second ends 34 with the flexible material positionable within the tube structure and outside the tube structure by passing through the tube opening. In preferred embodiments the obstruction 36 changes the volume of the tube 30. In an embodiment the movable frequency tuner deformable wall diaphragm obstruction flexible material is comprised of an elastomer. In an embodiment the movable frequency tuner deformable wall diaphragm obstruction flexible material is comprised of a fiber reinforced elastomer. In an embodiment the movable frequency tuner deformable wall diaphragm obstruction flexible material is comprised of a sheet. In an embodiment the movable frequency tuner deformable wall diaphragm obstruction flexible material is comprised of plastic. In an embodiment the movable frequency tuner deformable wall diaphragm obstruction flexible material is comprised of metal. The frequency tuner diaphragm 36 is positioned at the first takeoff frequency position by the first engine operation mode first pressure level, preferably with the takeoff fan speed air pressure. The frequency tuner diaphragm 36 is positioned at the second landing approach frequency position by the second engine operation mode second pressure level, preferably with the approach fan speed air pressure. Preferably the frequency tuner diaphragm 36 is positioned at a third frequency position with and an intermediate fan speed air pressure, preferably with the cut back operation mode. The first frequency position and the at least second frequency position tune the natural tube frequency to inhibit a plurality of troublesome noises. Preferably the movable frequency tuner diaphragm 36 is connected to an engine operation differential air pressure source so that the tuner diaphragm position change correlates with the change in engine operation differential air pressure. Preferably the deformed position deformable wall diaphragm 36 positions inward into the tube and outward from the tube path tunes the tube acoustic resonance frequency above and below $f_{no}$ to coincide with the blade pass frequency of the fan spinning inside the fan duct 22. Preferably the diaphragm movable material 56 is moved to tune and minimize the tube impedance so that a maximized acoustic energy goes through the tube 30. Preferably the tube path length of the tube between entrance 34 and exit 34 is maintained, with the flexible diaphragm obstruction material 56 anchored to the inflexible tube structure to inhibit changing the tube path length, with the tube path length between ends 34 maintained by the inflexible tube structure to which the diaphragm obstruction is mounted to. Preferably the flexible diaphragm obstruction material 56 is deformed by relative air pressure differential on its tube path interior side 58 and its tube path exterior side 60, preferably with the relative air pressure differential on the interior side 58 and exterior side 60 provided from the aircraft flight operation modes, preferably from operation pressure differential sources, with the differential sources pressure difference correlating with the changes in the operation modes.

An embodiment the invention includes an aircraft engine, the aircraft engine having a takeoff speed with a takeoff fan speed air pressure and a landing speed with a landing fan speed air pressure. The aircraft engine includes a fan duct with at least a first acoustic control tube, the tube having a fixed non variable tube path length between a tube entrance end and a distal tube exit end, the tube having a nonaltered untuned natural frequency $f_{no}$. The acoustic control tube contains at least a first movable frequency tuner, the movable frequency tuner movable between a first takeoff frequency position, and a second landing frequency position, the frequency tuner positioned at the first takeoff frequency position with the takeoff fan speed air pressure, the frequency tuner positioned at the second landing frequency position with the landing fan speed air pressure.

An embodiment the aircraft turbine engine 20 has a takeoff fan speed with a takeoff fan speed air pressure and a landing approach speed with a landing approach fan speed air pressure, with the aircraft engine fan duct 22 including at least a first HQ acoustic control tube 30. Tube 30 has a fixed non variable tube path length 32 between tube entrance end 34 and distal tube exit end 34, preferably maintained by an inflexible tube structure, with the tube having a nonaltered untuned natural frequency $f_{no}$. The tube includes at least a first movable frequency tuner deformable wall diaphragm obstruction 36, preferably comprised of a movable diaphragm flexible material 56. The movable frequency tuner obstruction diaphragm 36 is flexibly movable between a first takeoff frequency diaphragm position and at least a second landing approach frequency diaphragm position, with the frequency tuner diaphragm positioned at the first takeoff frequency position with the takeoff fan speed air pressure, and the frequency tuner diaphragm positioned at the second landing frequency position with the landing fan speed air pressure. Preferably the movable frequency tuner deformable wall diaphragm obstruction 36 is a flexible material 56 anchored to and filling a nonexit nonentrance opening in the inflexible tube structure. In an embodiment the movable frequency tuner deformable wall diaphragm obstruction flexible material is comprised of an elastomer. In an embodiment the movable frequency tuner deformable wall diaphragm obstruction flexible material is comprised of a fiber reinforced elastomer. In an embodiment the movable frequency tuner deformable wall diaphragm obstruction flexible material is comprised of a sheet. In an embodiment the movable frequency tuner deformable wall diaphragm obstruction flexible material is comprised of plastic. In an embodiment the movable frequency tuner deformable wall diaphragm obstruction flexible material is comprised of metal. The frequency tuner diaphragm 36 is positioned at the first takeoff frequency position by the first engine operation mode first pressure level, preferably with the takeoff fan speed air pressure. The frequency tuner diaphragm 36 is positioned at the second landing approach frequency position by the second engine operation mode second pressure level, preferably with the approach fan speed air pressure. Preferably the frequency tuner diaphragm 36 is positioned at a third frequency position with and an intermediate fan speed air pressure, preferably with the cut back operation mode. The first frequency position and the at least second frequency position tune the natural tube frequency to inhibit a plurality of troublesome noises. Preferably the movable frequency tuner diaphragm 36 is connected to an engine operation differential air pressure source so that the tuner diaphragm position change correlates with the change in engine operation differential air pressure. Preferably the deformed position deformable wall diaphragm 36 positions inward into the tube and outward from the tube path tunes the tube acoustic resonance frequency above and below $f_{no}$ to coincide with the blade pass frequency of the fan spinning inside the fan duct 22. Preferably the diaphragm movable material 56 is moved to tune and minimize the tube impedance so that a maximized acoustic energy goes through the tube 30. Preferably the tube path length of the tube between entrance 34 and exit 34 is maintained, with the flexible diaphragm obstruction material 56 anchored to the inflexible tube structure to inhibit changing the tube path length, with the tube path length between ends 34 maintained by the inflexible tube structure to which the diaphragm obstruction is mounted to. Preferably the flexible diaphragm obstruction material 56 is deformed by relative air pressure differential on its tube path interior side 58 and its tube path exterior side 60, preferably with the relative air pressure differential on the interior side 58 and exterior side 60 provided from the aircraft flight operation modes, preferably from operation pressure differential sources, with the differential sources pressure difference correlating with the changes in the operation modes.

Figure 8:
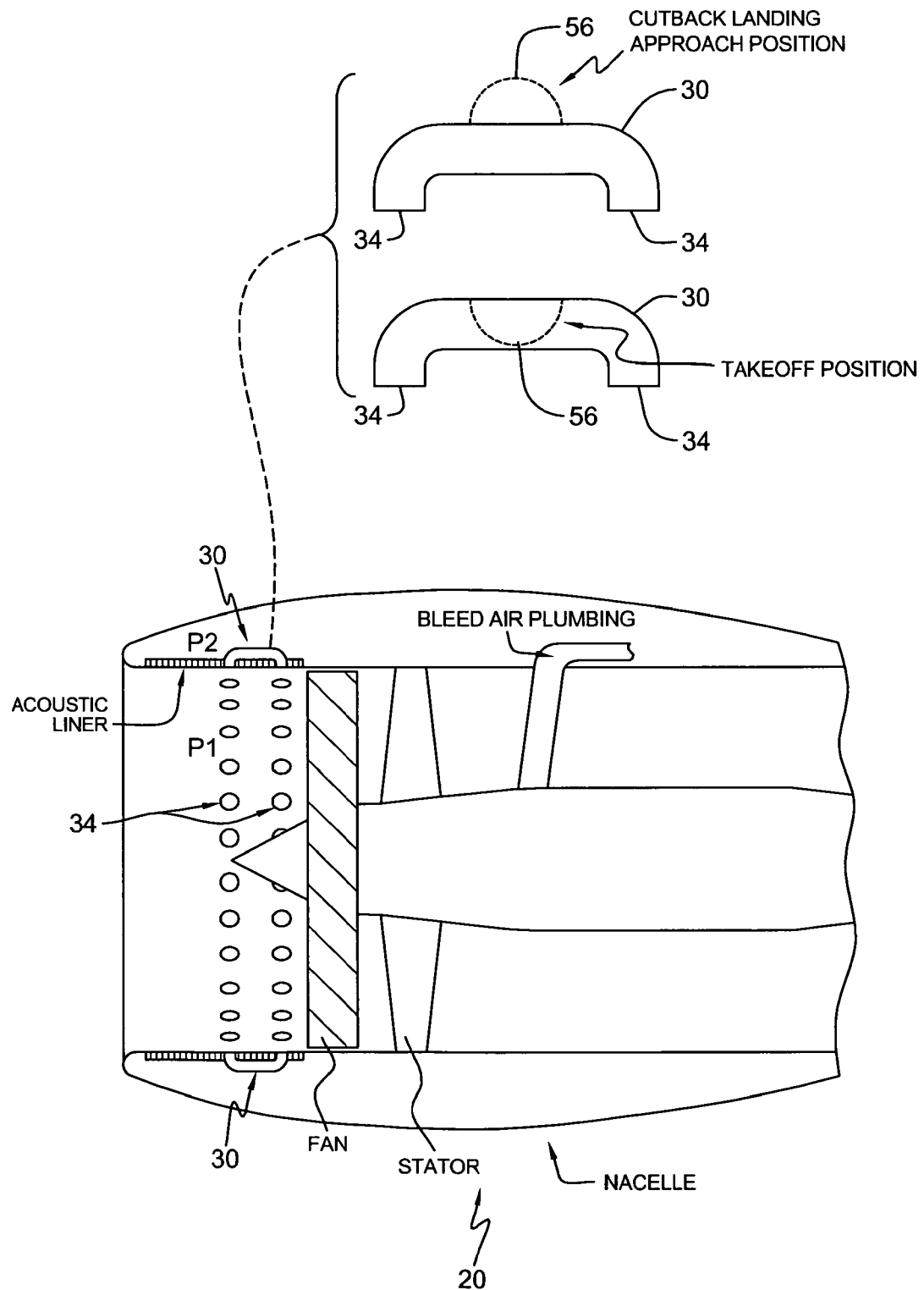
FIG. 8 illustrates an aircraft turbine engine with noise reduction tubes exposed to pressure differentials P2 and P1 (with a cutback landing approach position and a takeoff position).
Figure 9:
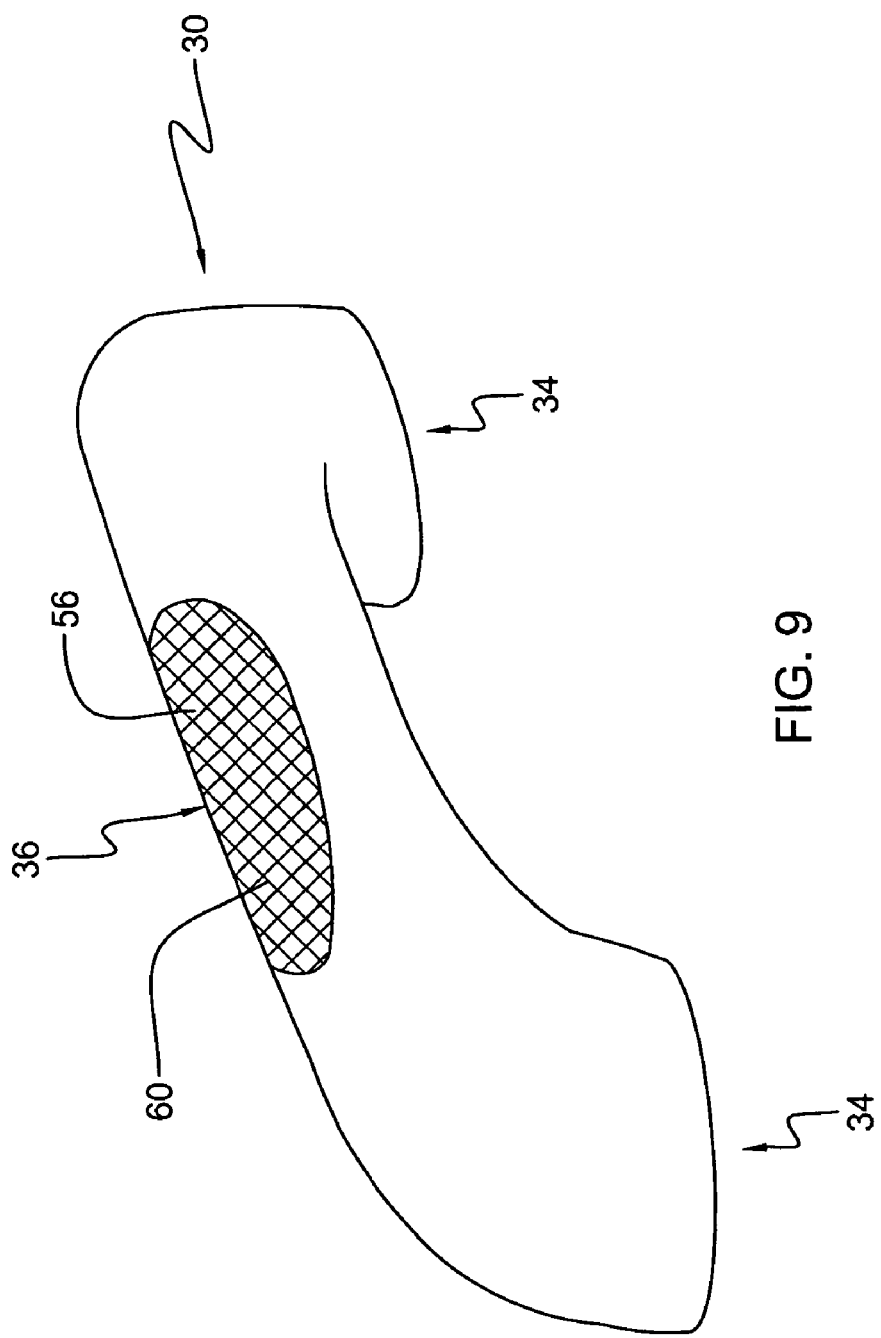
FIG. 9 illustrates a noise reduction tube such as utilized in FIG. 8.

In an embodiment as shown in FIG. 8 a pressure differential is shown as P2 on the exterior side 60 of tube 30 and P1 on the interior side 58. Preferably a tube 30 such as shown in FIG. 9 is utilized, preferably with the frequency tuner diaphragm 36 comprised of a binary diaphragm obstruction with a concave diaphragm position and a convex diaphragm position, preferably with no intermediate position. Preferably the binary diaphragm obstruction frequency tuner diaphragm 36 comprised of a flexible diaphragm obstruction material 56, preferably a elastomer reinforced with a fabric. Preferably with a pressure differential between the binary diaphragm obstruction frequency tuner diaphragm exterior side 60 and interior side 58 the diaphragm pops either into or out away from the tube interior. Preferably without a pressure drop in FIG. 8, the diaphragm assumes its default position of convex. At takeoff, the fan speed is at a high maximum and the blade pass tone is at a high level, for example 1000 Hz. The pressure P1 is lower than the pressure P2, and the frequency tuner diaphragm 36 is deflected inward into the tube interior with the tube interior volume decreasing, preferably with the third acoustic mode excited, to provide noise reduction at the takeoff operation mode. Preferably at the cutback mode condition, the fan speed is reduced to an intermediate fan speed, such as a reduced speed with a blade pass frequency for example of 900 Hz, with the pressure P1 and P2 approximately equal, with the diaphragm popping out to its binary convex shape with the tube cavity interior volume increased. This popped out diaphragm popping out to its binary convex shape preferably being the natural default position, with this binary convex shape popped out position continuing into the landing approach mode of the aircraft engine at its lower fan speed, with such convex shape second landing approach frequency position positioned by the second engine operation mode second pressure level pressure differential between P1 and P2 with the approach landing operation noise reduced by the convex diaphragm tuned tube 30.

Figure 10:
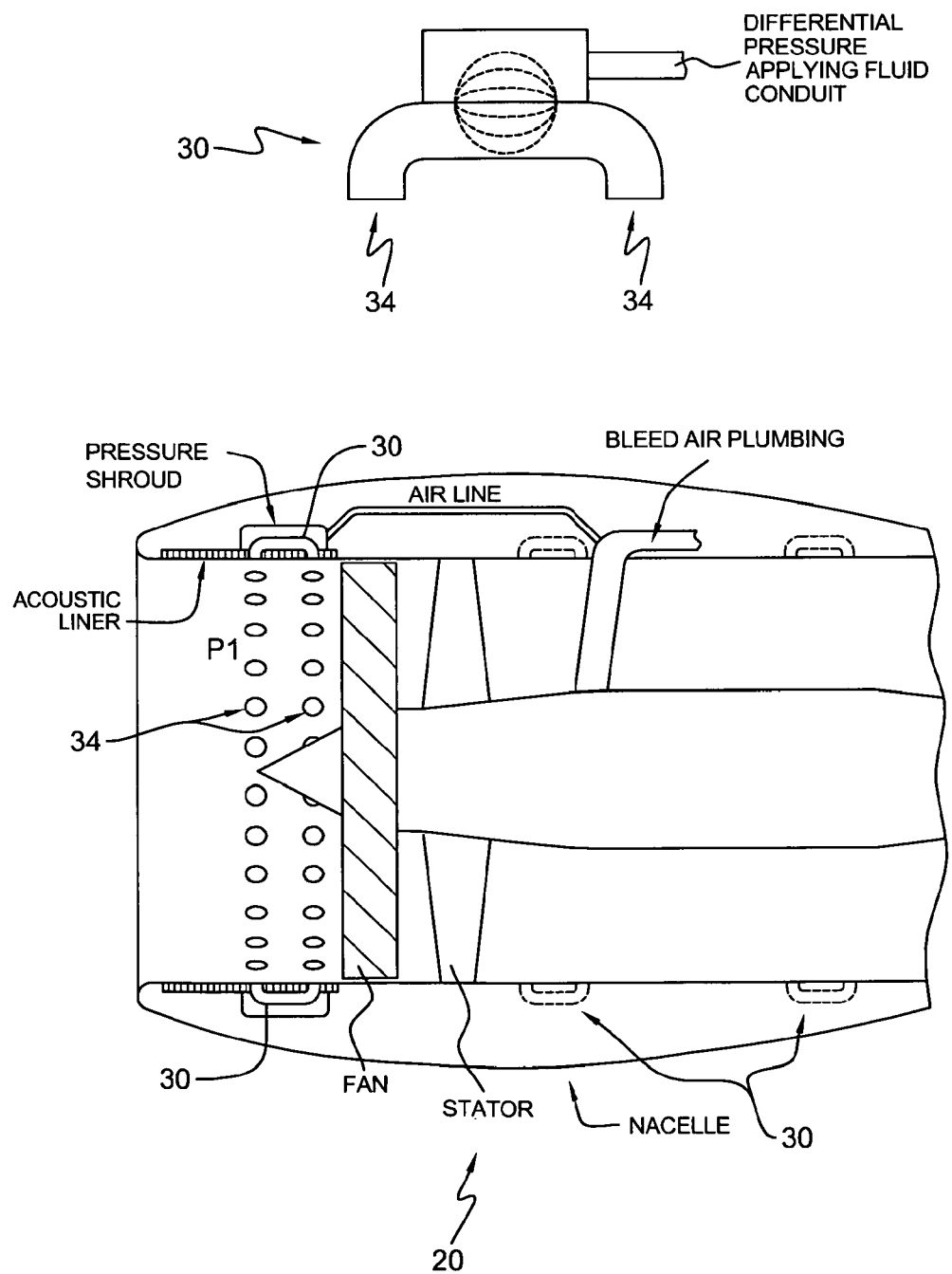
FIG. 10 illustrates an aircraft engine with noise reduction tubes shrouded in a pressure shroud and connected with a fluid conduit for applying a differential pressure.
Figure 11:
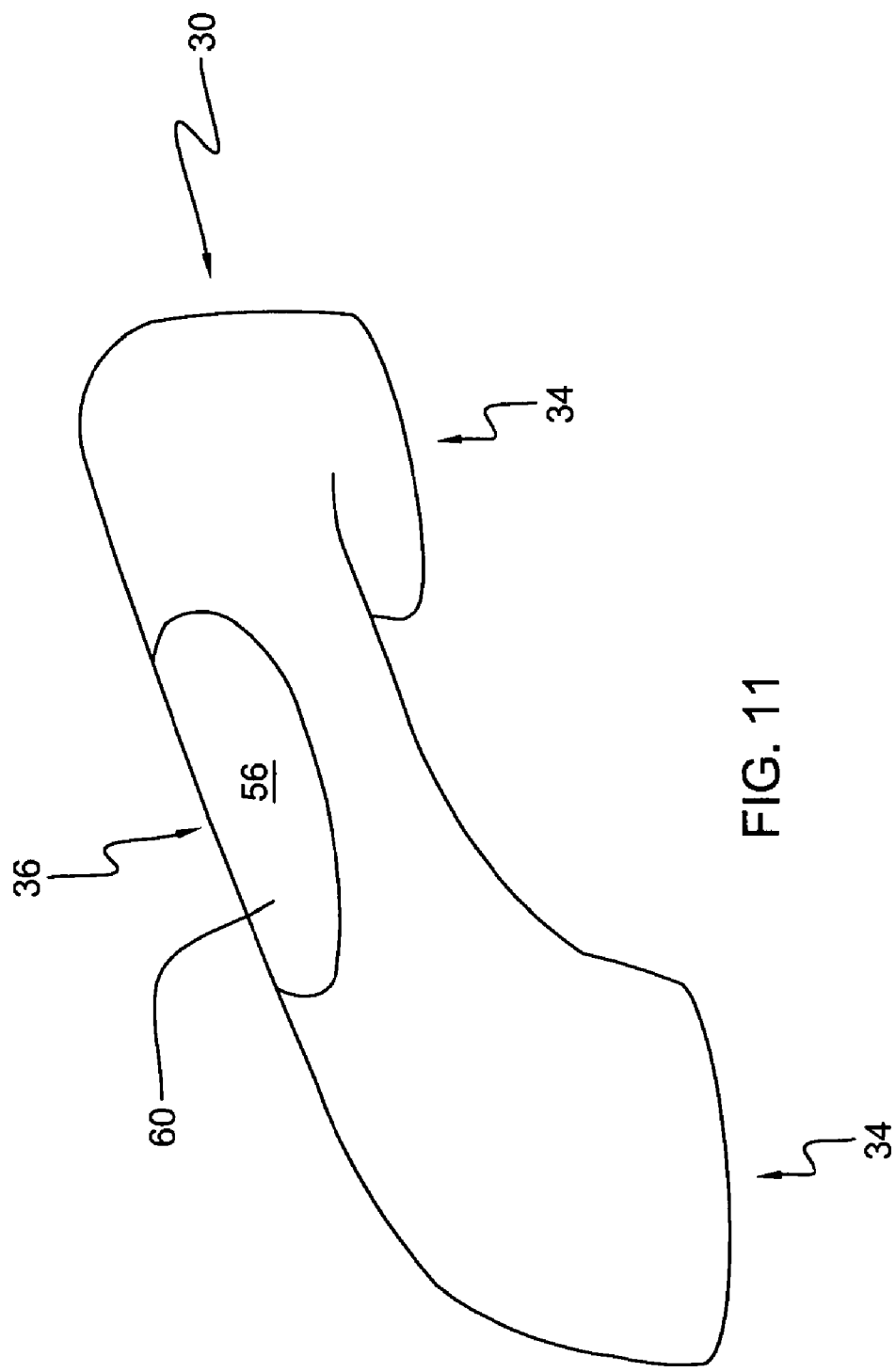
FIG. 11 illustrates a noise reduction tube such as utilized in FIG. 10.

In an embodiment as shown in FIG. 10, the turbofan engine bleed air source is utilized to provide a differential pressure source, preferably with the bleed air source having a pressure that is monotonic with fan speed, with the tube 30 provided with a diaphragm 36. Preferably a tube 30 such as shown in FIG. 11 is utilized, preferably with the frequency tuner diaphragm 36 comprised of an elastomeric default diaphragm obstruction with a concave diaphragm position and a convex diaphragm position, preferably with the convex shaped position as the default position. Preferably the tube 30 default diaphragm obstruction is provided with a flexible material 56, preferably a molded elastomer with the convex shape being the as molded shape of the obstruction 36. Preferably the diaphragm obstruction frequency tuner diaphragm 36 is deflected from its convex shaped default position by the application of a pressure. The diaphragm deflects to match the third mode to the high fan speed at the takeoff operation mode, and also preferably the cutback operation mode. Preferably the second mode lines up with the landing approach conditions.

In an embodiment the frequency tuner diaphragm 36 is binary with only the fully convex and the fully concave positions. In an embodiment the frequency tuner diaphragm 36 has an analog variable position range, with the position of the diaphragm between fully convex and fully concave variable with the level of applied bleed air pressure applied that deflates and inflates the diaphragm.

Figure 12:
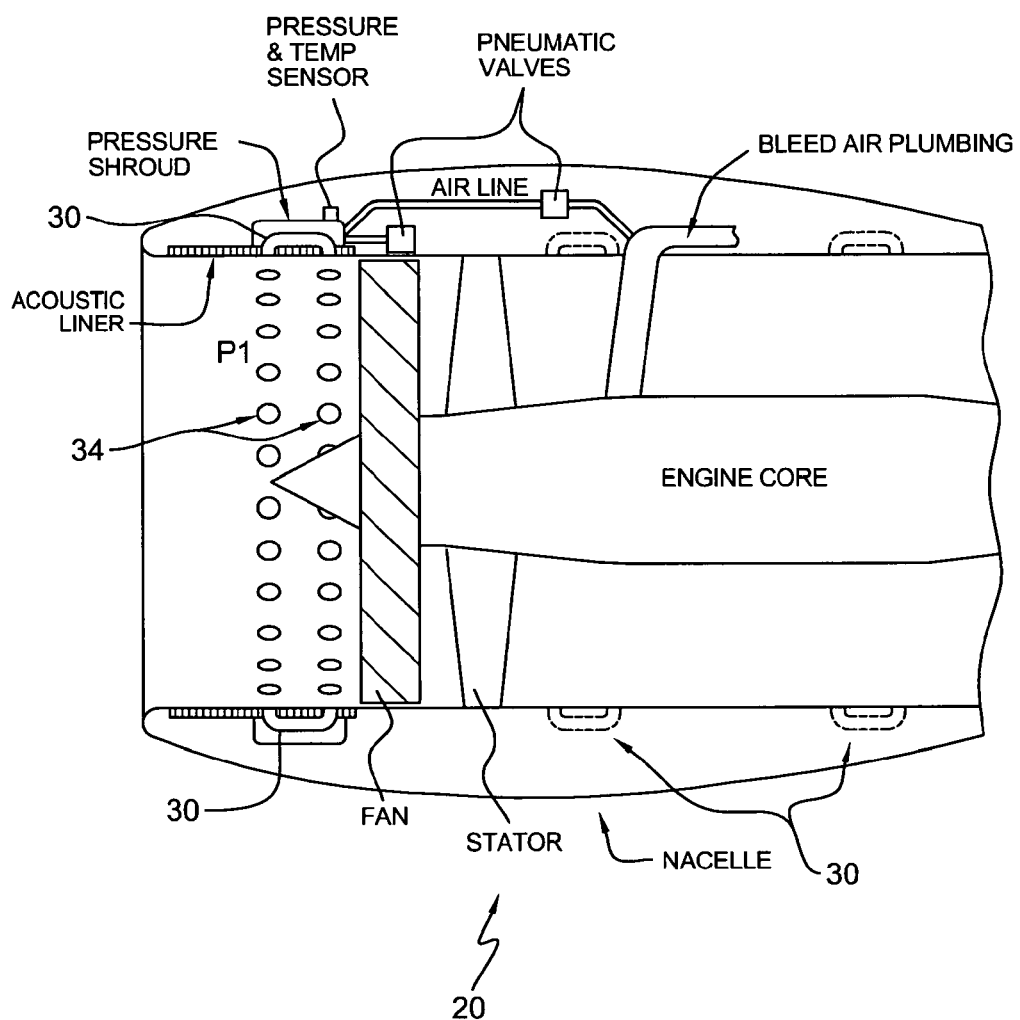
FIG. 12 illustrates an aircraft engine with noise reduction tubes shrouded in a pressure shroud and connected with a fluid conduit for applying a controlled pressure differential.
Figure 13:
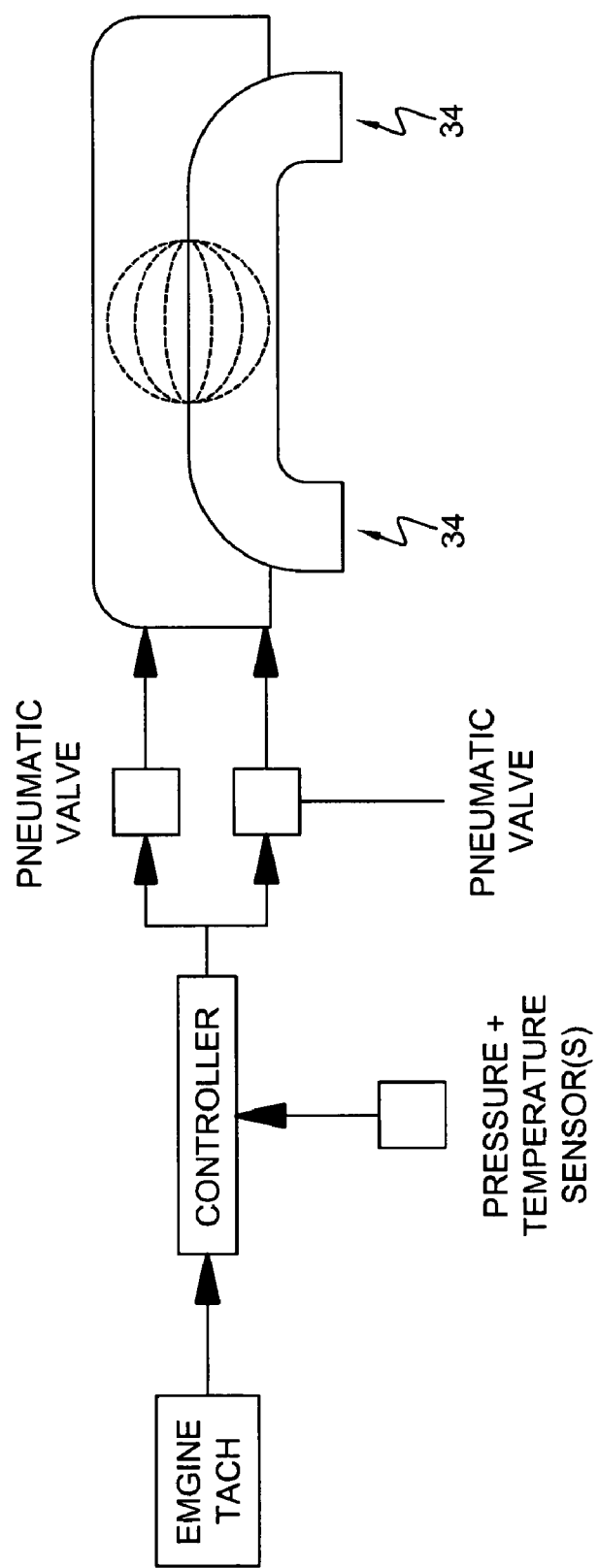
FIG. 13 illustrates a noise reduction tube with a controlled pressure differential applied to the tube with the electronic controller utilizing inputs to reduce noise.

In an embodiment as shown in FIG. 12, a controlled pressure differential is applied to the tube 30 to controllably position the obstruction diaphragm 36 to minimize noise. Preferably a tube 30 such as shown in FIG. 11 is used, preferably an elastomeric diaphragm, preferably a convex as molded default position diaphragm, with pressure deflecting it into a concave position. Preferably the embodiment is electronically controlled, preferably such as shown in FIG. 13 with the controller utilizing noise and vibration inputs from sensors such as microphones. Preferably the controller controls the application of a pressure differential based on the input of an engine tach. Preferably the controller utilizes a table lookup to determine the pressure differential to be applied with the pneumatic valves for the then current fan speed engine tach, with the determined pressure preferably based on fan speed and temperature, with a proportional integral control on the valves to provide the determined pressure to minimize noise at the current engine operation.

Figure 14:
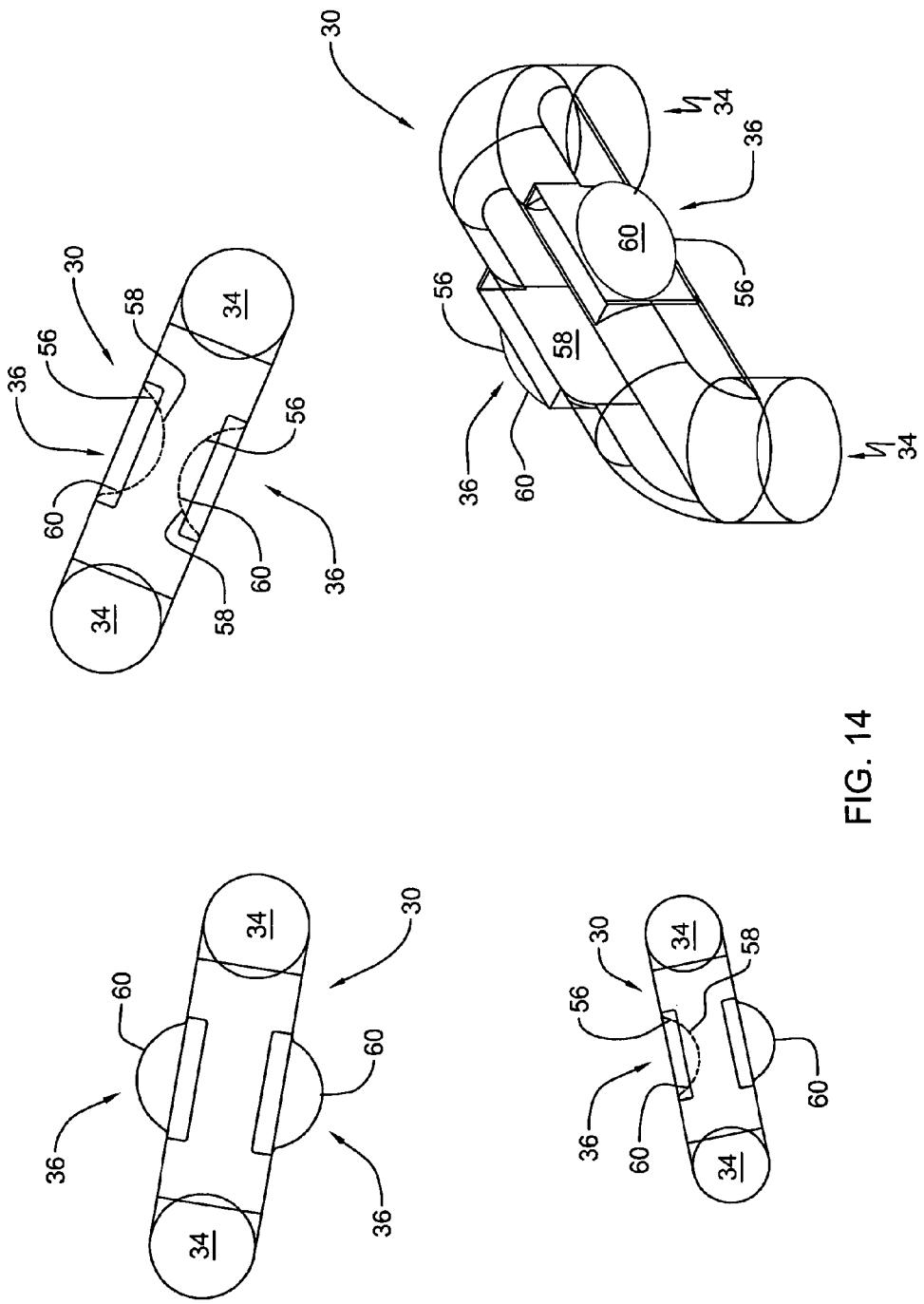
FIG. 14 illustrates noise reduction tubes with two obstruction diaphragms.

FIG. 14 shows tube embodiments with obstruction diaphragms 36. In an embodiment the diaphragms are binary diaphragms, preferably with both diaphragms similar in terms of their default position and applied pressure differential required to position them from their default position. In an embodiment the diaphragms are continuously variable analog diaphragms with a plurality of inflated and deflated positions, preferably with both diaphragms similar in terms of their applied pressure differential required to position them at the variable positions. In an embodiment the diaphragms are both binary, preferably dissimilar such that each pops in and out at different pressures applied between the tube interior and exterior.

Figure 15:
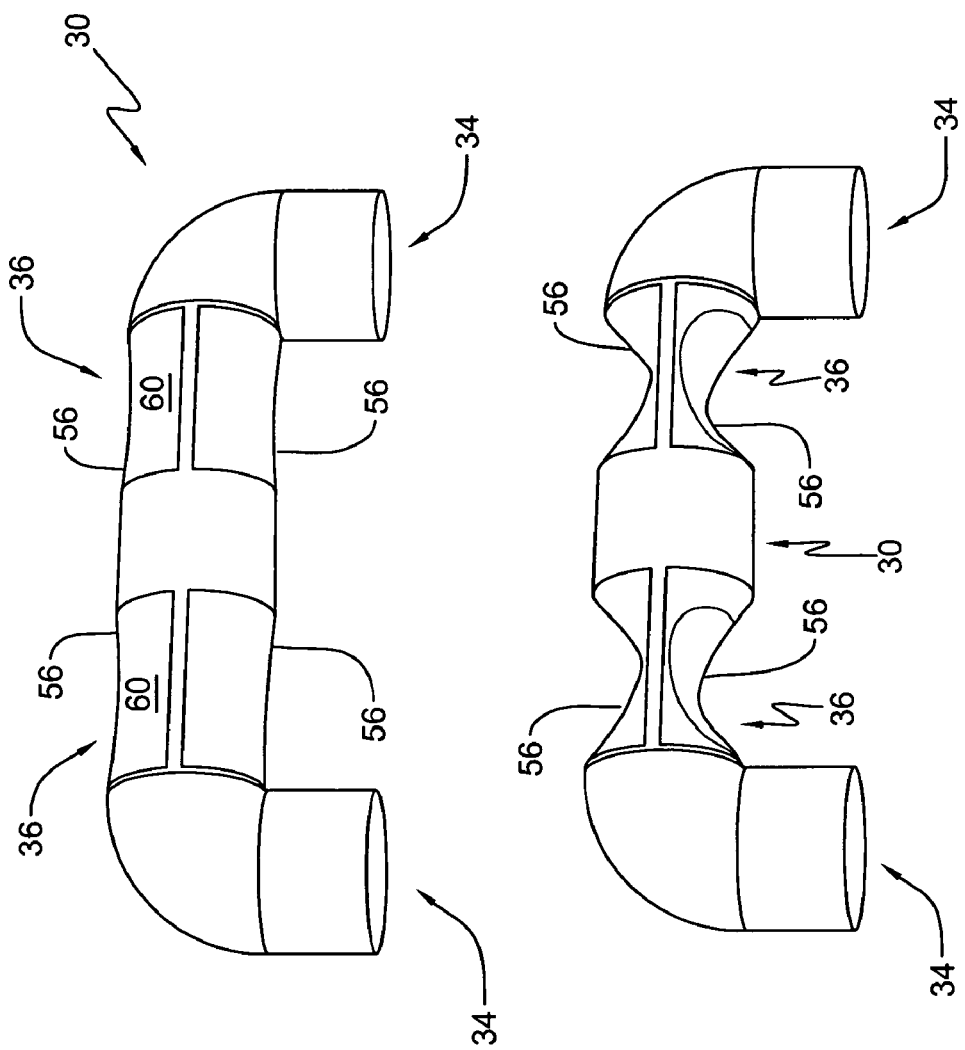
FIG. 15 illustrates a noise reduction tube with four obstruction diaphragms.

FIG. 15 shows tube embodiments with obstruction diaphragms 36. In a embodiment of FIG. 15 the tube 30 is utilized on a bypass duct, with a high pressure differential at takeoff positioning the obstruction diaphragm material 56 in a near tubular cylinder position as shown in the top tube depiction, and with a low pressure differential at landing approach positioning the obstruction diaphragms inward into the tube path with a reduced tube interior volume as shown in the lower tube depiction. Preferably with the bypass duct tube 30, the pressure drop differential applied to the tube diaphragm is approximately a monotonic function of fan speed, preferably with the diaphragms having with a continuous pressure-volume relationship that tracks the fan speed, preferably with the pressure-volume relationship embodying the inverse nonlinearity of the fan speed-to-pressure relationship. Preferably the obstruction diaphragm material 56 is a flexible elastomer, preferably not fabric reinforced. Preferably, the obstruction diaphragm(s) 36 for the bypass duct are located at pressure nodes in order to affect the local inertia.

Figure 16:
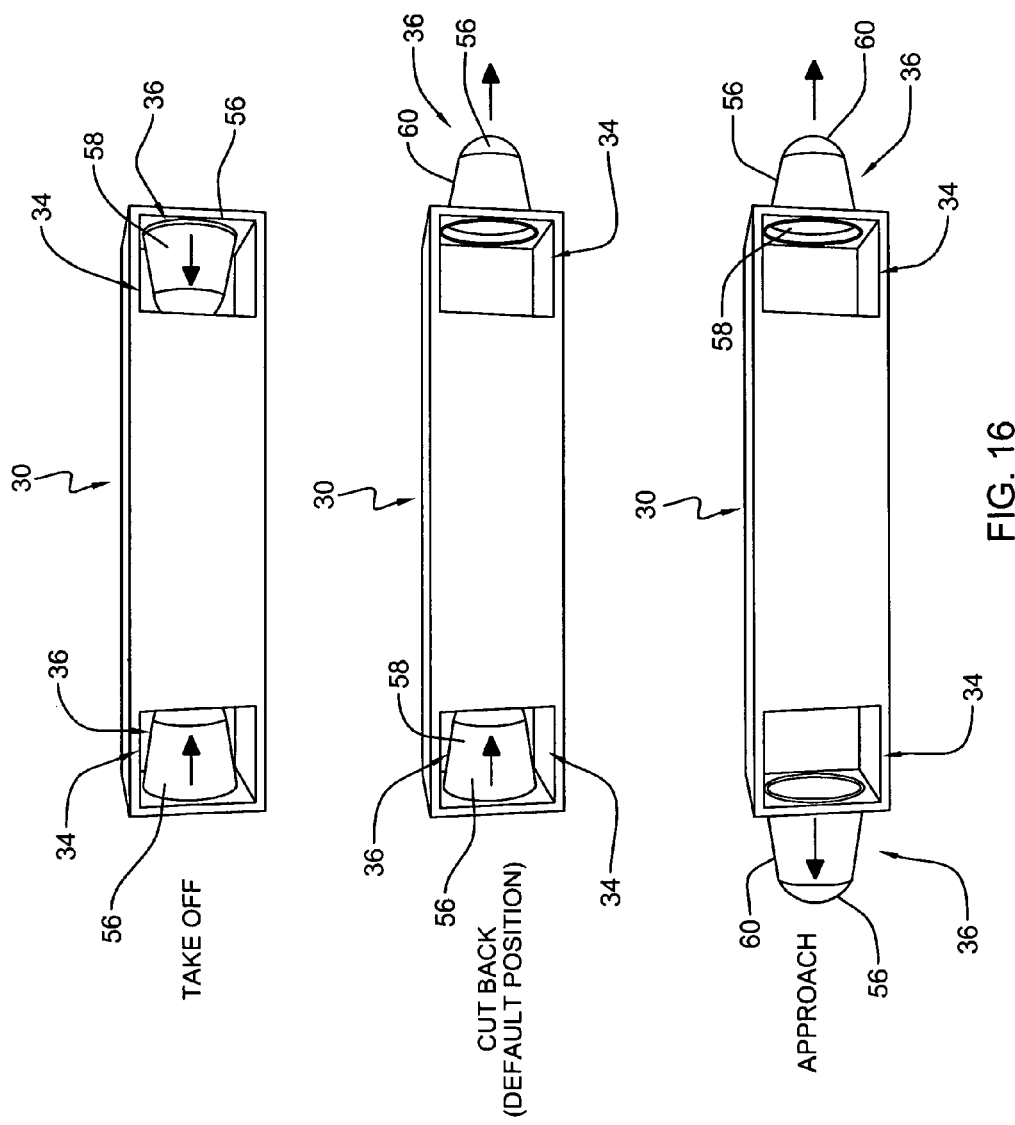
FIG. 16 illustrates a noise reduction tube with two obstruction diaphragms.
Figure 18:
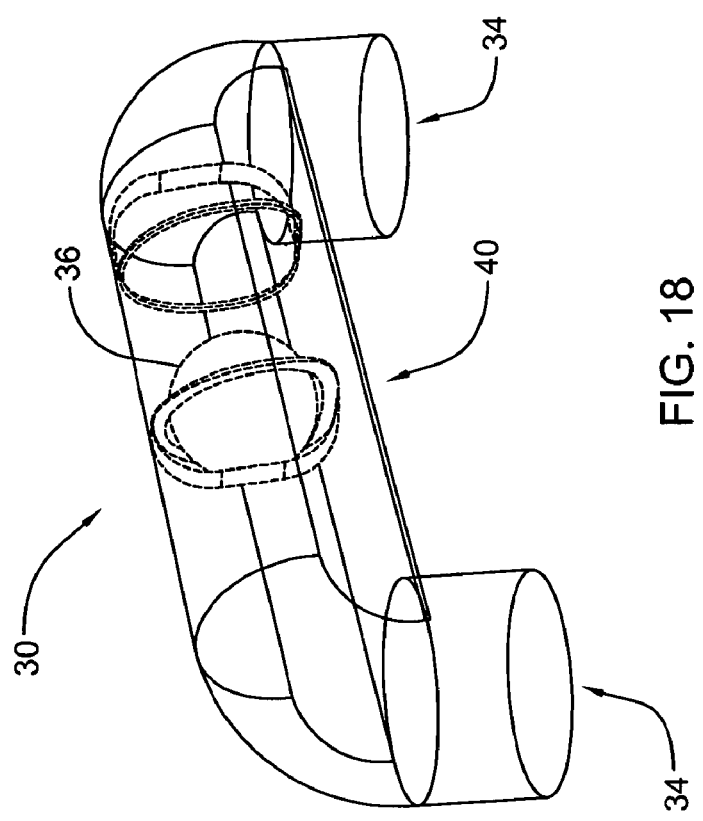
FIG. 18 illustrates an acceleration activated noise reduction tube with a moving frequency tuner obstruction ball in a takeoff location.
Figure 19:
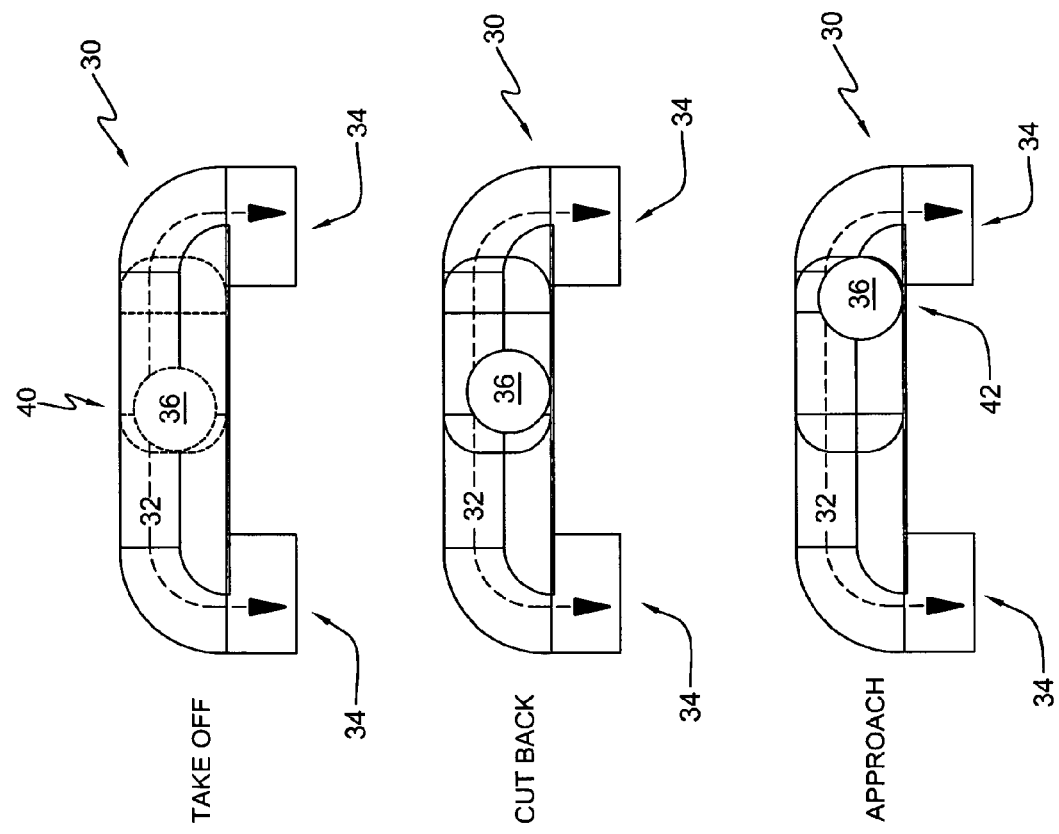
FIG. 19 illustrates an acceleration activated noise reduction tube with a moving frequency tuner obstruction ball in takeoff, cut back, and approach locations.

FIG. 16 shows tube embodiments with obstruction diaphragms 36, preferably proximate the entrance and exit ends 34. In an embodiment of FIG. 16 the pressure activated tube 30 is utilized on the turbine engine inlet. Preferably the obstruction diaphragms 36 are binary, and at takeoff the negative pressure drop across the liner (nacelle interior pressure is above inlet pressure) will pop the obstruction diaphragms 36 inward, reducing the local air volume and higher frequency resonance in the tube. At a later operation mode (such as cruise cutback or initial decent), the inlet pressure is sufficiently positive to pop at least one of the diaphragm obstructions outward, increasing the local volume and lowering the frequency appropriate for the approach regime of flight. Multiple diaphragms are preferably provided with different switch pressures to achieve trinary adaptation, with such providing for three regimes of operation modes that generate noise (such as takeoff, cutback, and approach). Preferably at approach landing both obstructions 36 are positioned outward.

Preferably the obstruction diaphragms utilize the pressure differentials present during the flight operation modes such that the diaphragm positions naturally adapt to the then present operation conditions to inhibit noise generated at that operation mode. In alternative embodiments the obstruction diaphragm positions are controlled with a controller, preferably with the controller utilizing an engine tach input to control the obstruction position to correlate with the fan blade pass frequency and troublesome noise generated at the then present operation mode.

Preferably the acoustic modes of tubes 30 are adapted by harnessing the unbalanced fore-aft acceleration present on the vehicle to adapt the modal frequencies of the tubes to tune to the frequency of the disturbance (preferably the fan blade pass frequency) or by harnessing the unbalanced pressure differentials present on the vehicle to adapt the modal frequencies of the tubes to tune to the frequency of the disturbance. Preferably the unbalanced acceleration obstruction moving force is a combination of gravity and the rate of change in velocity of the vehicle. Preferably a track and/or end stops are included in the tube 30 to position the movable obstruction appropriately for the typical disturbance frequency associated with the fore-aft acceleration of different flight regimes, particularly takeoff and landing. Preferably the unbalanced pressure differential obstruction moving force is from an operation mode pressure differential, preferably with the magnitude of the pressure differential correlating with an operational mode.

Preferably the acoustic modes of tubes 30 are adapted by harnessing the unbalanced fore-aft acceleration present on the vehicle to adapt the modal frequencies of the tubes to tune to the frequency of the disturbance (preferably the fan blade pass frequency) or by harnessing the unbalanced pressure differentials present on the vehicle to adapt the modal frequencies of the tubes to tune to the frequency of the disturbance. Preferably the unbalanced acceleration obstruction moving force is a combination of gravity and the rate of change in velocity of the vehicle. Preferably a track and/or end stops are included in the tube 30 to position the movable obstruction appropriately for the typical disturbance frequency associated with the fore-aft acceleration of different flight regimes, particularly takeoff and landing. Preferably the unbalanced pressure differential obstruction moving force is from an operation mode pressure differential, preferably with the magnitude of the pressure differential correlating with an operational mode.

In an embodiment as shown in FIG. 17, the attitude angle during takeoff provides for rolling of the ball 36 up the ramp of the aft (left) end stop takeoff path location 40. Preferably the attitude angle during cutback is not sufficient to hold the ball 36 in that ramp takeoff path location 40, and it rolls down the ramp of the aft end stop, but preferably remains in contact with it. The attitude angle during approach preferably rolls the ball to the forward (right) end stop second landing frequency obstruction tube path location 42. In an embodiment the tube 30 has a mounted gravity biased orientation tilted downward, such as about 3 degrees down, preferably with the engine 20 mounted gravity biased orientation tilted downward a few degrees relative to the fuselage centerline providing such tube mounted gravity biased orientation tilted downward. In an embodiment a frequency obstruction tube path location is located at a pressure node of the tube 30, preferably with the obstruction location at the pressure node providing a decreased tube resonant frequency. In an embodiment a frequency obstruction tube path location is located at a pressure anti-node of the tube 30, preferably with the obstruction location at the pressure anti-node providing an increased tube resonant frequency. In preferred embodiments the obstructions 36 tune the tubes 30 between different acoustic modes, preferably with the obstruction position tuning the tube 30 to the second and third acoustic modes, preferably with the third acoustic mode for the first takeoff frequency obstruction tube path location 40, and the second acoustic mode for the second landing approach frequency obstruction tube path location 42.

Figure 20:
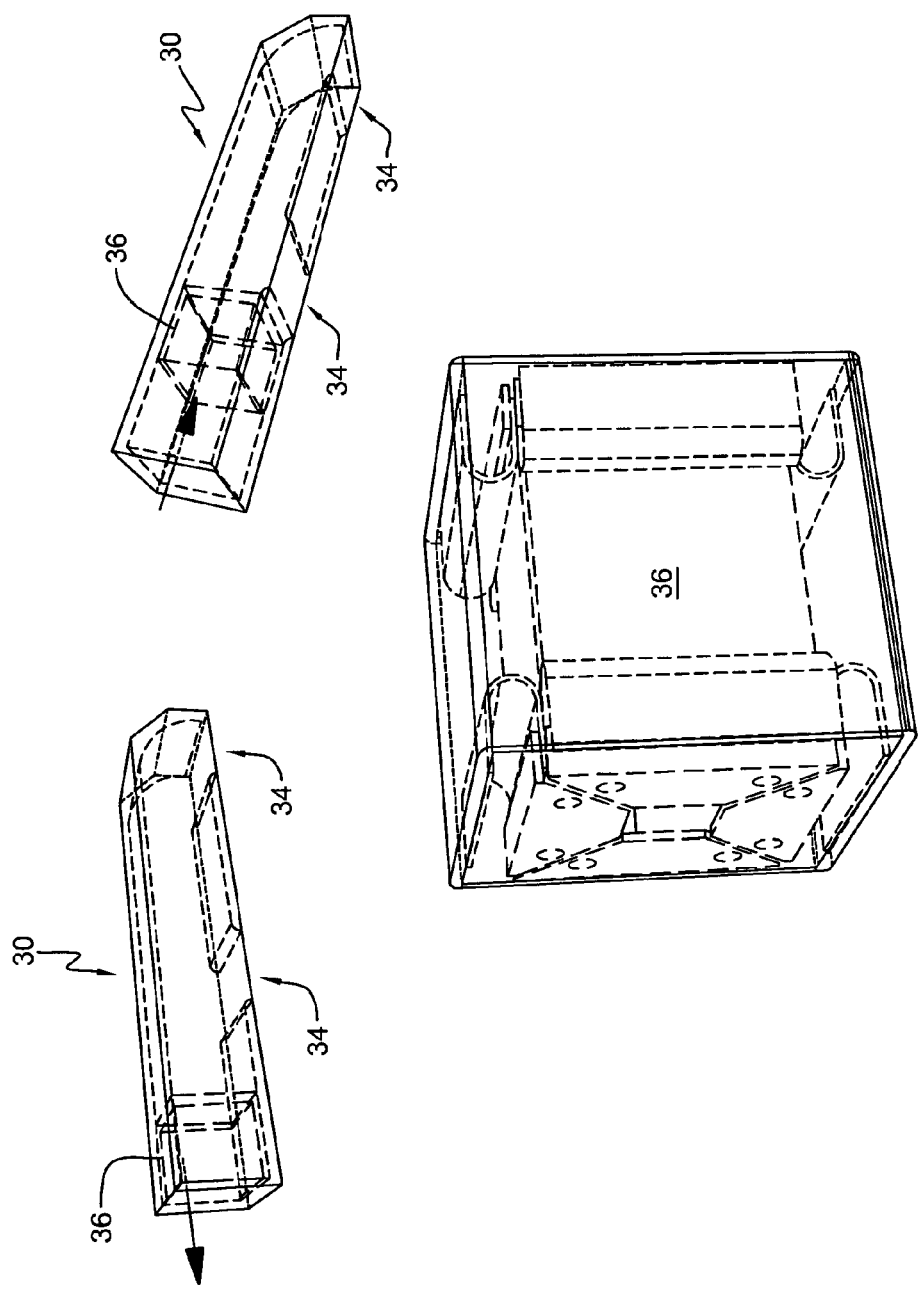
FIG. 20 illustrates a noise reduction tube with a moving frequency tuner piston obstruction suspended on rolling flexures.

FIG. 20 illustrates an embodiment with a moving obstruction 36 with soft rolling flexure mover appendages to facilitate the movement of the obstruction along the tube path. Piston obstruction 36 suspended on soft rolling flexures utilizes unbalanced force to tune the acoustics of the tube, moving along the tube path on the mover appendages similar to the ball obstruction 36 rolling along the tube path.

Figure 21:
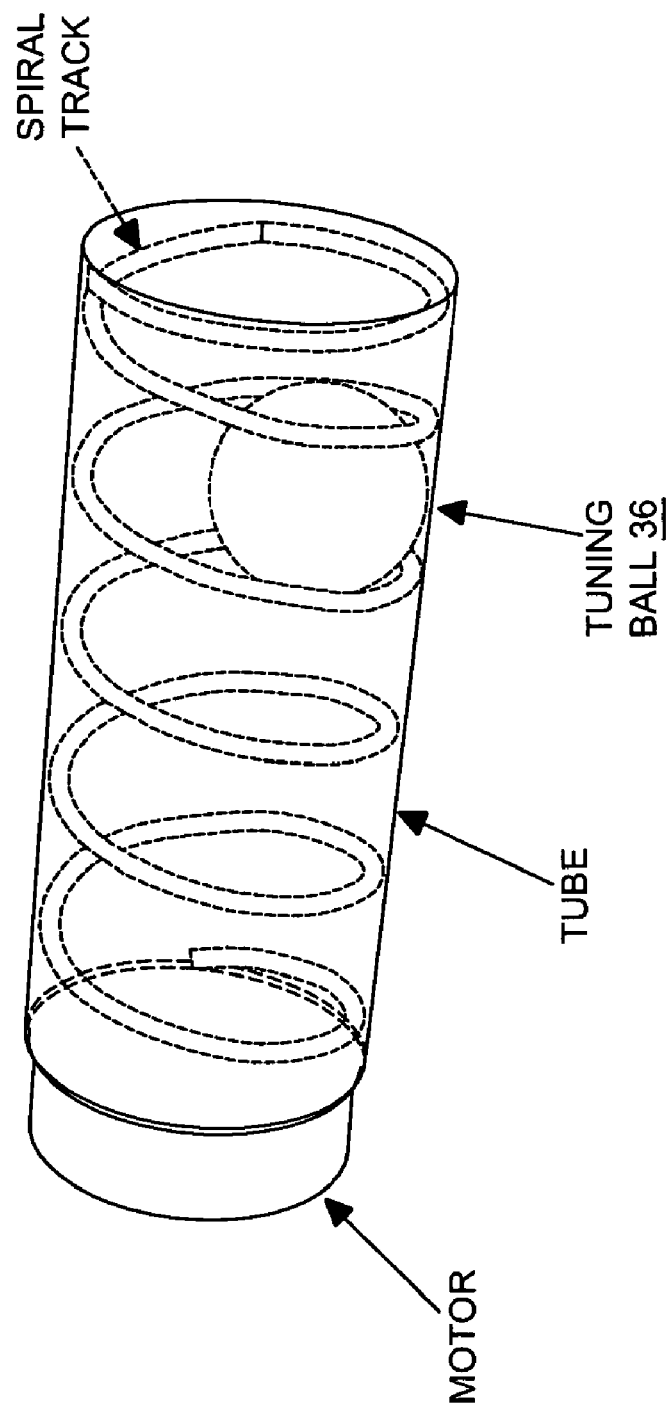
FIG. 21 illustrates a noise reduction tube with a ball obstruction moved with a lead screw drive driven by a controlled motor to position the obstruction at locations within the tube.

FIG. 21 illustrates a noise reduction tube with a ball obstruction 36 moved with a lead screw drive driven by a controlled motor to position the obstruction at locations within the tube. In a preferred embodiment the motor screw driven ball obstruction is utilized with a Helmholtz resonator noise reduction tube.

As shown in FIG. 5 ball obstruction 36 is positioned by fore-aft acceleration, which is preferably a combination of aircraft vehicle attitude and thrust. The upper plot shows angle of attack for aircraft flight operation regimes. Preferably the ball 36 rolls downhill to a position that shifts the acoustic resonance to coincide with the blade pass frequency of the operation regimes of flight.

Figure 4:
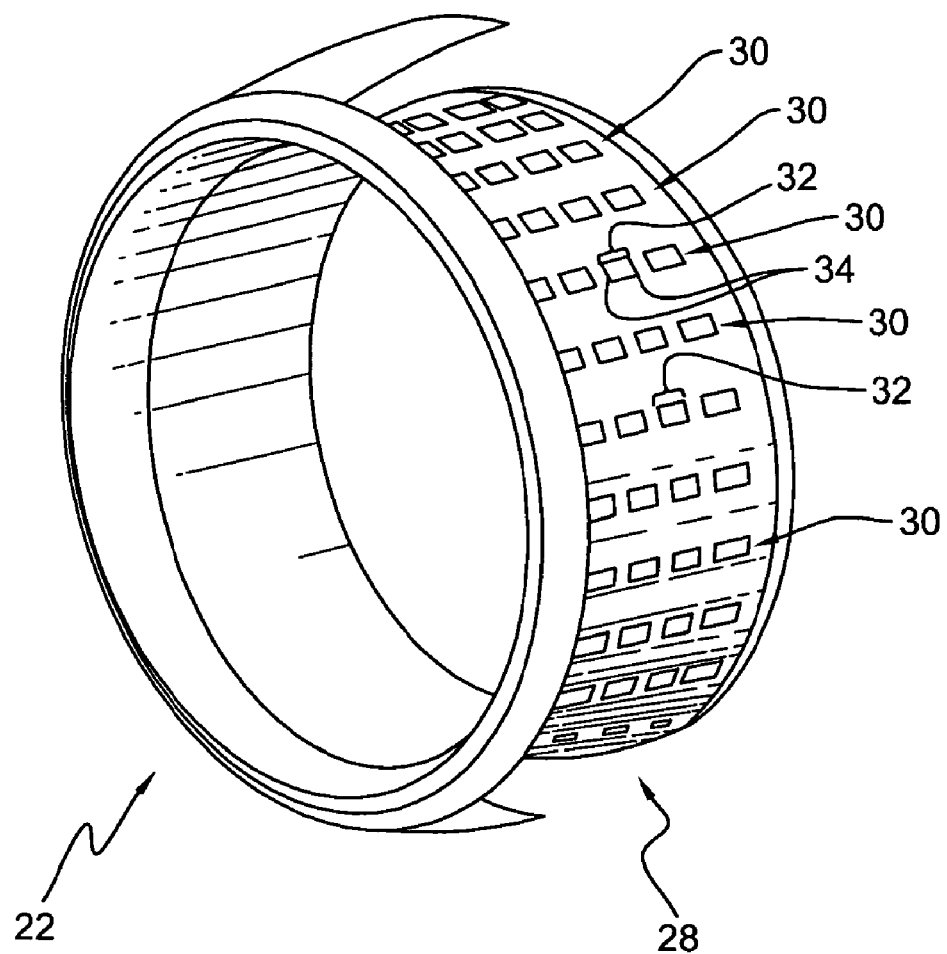
FIG. 4 illustrates a turbine engine member with noise reduction tubes.
Figure 4A:
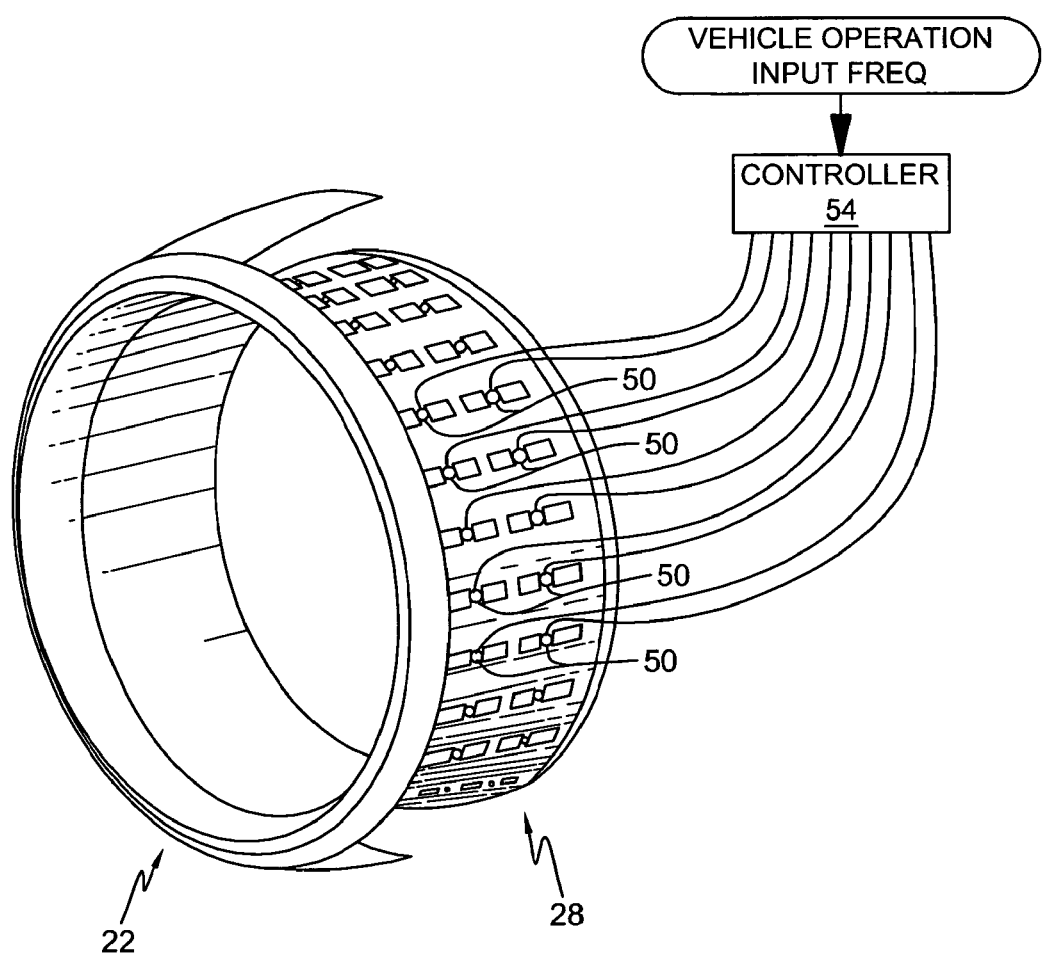
FIG. 4A illustrates a turbine engine member with noise reduction tubes with an electronic controller controlling noise reduction tube motors with vehicle operation inputs.

FIGS. 4A and 7 show preferred embodiments with an electronic controller 54 controlling motor drivers 50, preferably with each controlled motor 50 driving a fore and an aft aligned tunable tube 30. In an embodiment the tubes 30 are circumferentially mounted with about 40 paired acoustic tubes 30 on an acoustic liner of the engine 20. Preferably electrical power is supplied via a dedicated line from a standard circuit breaker protected distribution box from the aircraft. Preferably control input to the controller will be engine speed, preferably a tachometer line input into the controller 54. The controller 54 preferably positions the balls 36 in the tubes in a synchronized manner based on a look-up table that relates engine speed to ball location.

Preferably the motors 50 are comprised of stepper motors which preferably provide a holding torque when unpowered and are preferably controlled without position sensors. The stepper motors 50 preferably drive the balls 36 with a drive shaft 52, preferably a threaded drive shaft with a lead screw pitch providing drive torque, holding torque, and positional accuracy. Preferably the system operates with an open loop control scheme, preferably with the initial power-on procedure registering the ball positions at one end of the tube path travel. In preferred embodiments of FIG. 6-7, the tubes 30 are comprised of a first tube split 31 and a second tube split 31. Preferably the tube splits 31 are two symmetric tube split housings paired and connected together to house the obstruction 36 after the obstruction has been disposed between them, preferably along with the obstruction drive shaft 52. Preferably the tube splits are bonded together after disposition of the motor 50 and drive shaft lead screw assembly 52 between the splits to provide a two-tube assembly with aligned first and second tubes 30. Preferably the motor drive shaft tube assemblies are connected, preferably bonded, to acoustic liner lined duct 22, preferably in a noise reducing mounting pattern, preferably equally spaced radial distribution pattern using approximately 40 tube pairs per engine. Preferably the plurality of motors 50 are connected with lead wires to a driver electronics motor controller 54, which preferably utilizes an inputted engine operation speed tach signal to determine the position for the obstructions 36 in the tube path, preferably with the controller not utilizing noise and/or vibration sensor signals to determine such position. Preferably the tube splits 31 are symmetrical, preferably with the first and second splits 31 mirror symmetric with a plane of symmetry.

Preferably the tube splits are vertical split halves of the complete structural tube housing. Preferably the splits 31 are molded splits, in an embodiment the splits are provided by injection molding in a split tube mold. In an embodiment the splits are provided by blow molding in a split tube mold. Preferably the molded splits are molded with a motor receiver for receiving motor 50 positioned and mounted in the geometric center of the dual tube structure formed from the splits 31. Preferably after the motor, obstructions, and shaft are disposed within the split tube housing structure the motor lead slots and fastener holes are potted, with the dual tube structure providing airtight tube paths 32 when attached to the duct liner. In an embodiment the two tube path air cavities are in fluid communication along the motor shaft clearance holes on the sides of the motor. Preferably the electronic controlled noise reduction system includes the split tube actuator assembly with the lead screw and stepper motor assembly, bearings, motor mounts, and two acoustic obstruction balls. The lead screw and stepper motor assembly preferably comprises a double shaft stepper motor, preferably with a machined lead screw shafts press fitted to the motor shaft, and polymeric zero backlash nuts. Preferably the tubes 30 are tuned with the ball obstructions 36 with linear operation actuation. Preferably the electronic driver controller pulses the motor, which rotates the attached shafts, which tries to rotate the plastic nut/ball assembly, preferably with the nut/ball assembly rotary constrained by antirotation keys of the ball, which results in linear motion of the ball within its tube. Preferably the balls are moved as a synchronized pair, preferably in the same direction relative to each other. Preferably a symmetric split ball halves are is used to provide the balls 36, preferably with the split line in the same plane as the linear motion. Preferably the ball split feature is aligned with the shaft, preferably with the non-continuities from connecting the ball split halves (preferably caused by the bonding of the two ball splits) providing the anti-rotation key feature on the ball and with the split bond connection aligned with the flow of the tube path. In a preferred embodiment the components are provided and checked for compliance with specifications. The two motor mounts are preferably connected to the motor body. Preferably the two pairs of ball shell halves are connected (preferably bonded with adhesive) to their respective lead screw nut, while inhibiting bonding contamination the threads of the nut, preferably by allowing sufficient adhesive application and set time for the connection adhesive. Preferably the bonded ball/nut assemblies are shaft mounted, preferably attached by screwing on, preferably while ensuring that the ball/nut assemblies have a predetermined displacement between one ball from the other ball. Preferably the assembling provides a resulting orientation with the two anti-rotation key tabs aligned with each other. Preferably bearings are provided, preferably with Rulon bearings slid on to the machined ends of leadscrew shafts. Preferably the motor/ leadscrew assembly is disposed into a split tube housing half, preferably while positioning the leadscrew assembly in to the middle of the split shell, and aligning the two Rulon bearings in to their respective bearing cavities, and ensuring that the antirotation key tabs on the balls line up with their respective slot in the shell. Preferably the motor is secured to the tube structure, with motor wires routed in motor wire slots. Preferably the two split tubes 31 are connected, preferably bonded together with an adhesive, and preferably the two unused holes and motor wire slots are sealed. Preferably the motor 50 is a stepper motor, and is paired with the leadscrew drive and the two balls. Preferably the system is monitored by measuring the time it takes to change to a new offset location position and the ability to hold that position until the next commanded move. Preferably the controller 54 uses an open loop design implemented with an on/off controller pulsing the stepper motor, with a leadscrew actuator drive moving the balls. Preferably power to the motor 50 is removed under all conditions except actual commanded displacement change to tune the tube. Preferably the controller and motor initially register the balls in the power-on routine, preferably with the controller/driver electronics having a driver chip set that programmatically allows for both full step and half step operation. Preferably at initial power up, after the controller finishes its post, it drives the motors in one direction under half step loading conditions for a commanded displacement in excess of the total stroke length of the tube system, preferably with the balls moving to the point where the anti-rotation key feature engages a stop. After reaching this key stopped position the motor continues to be pulsed but it will not move in order to register the balls at a known position. After that initialization, the controller preferably drives the system in full step mode. Preferably the tube system is provided with a split shell pair, two ball shell pairs, motor/leadscrew/nut assembly, and Rulon bearing pair.

It will be apparent to those skilled in the art that various modifications and variations can be made to the invention without departing from the spirit and scope of the invention. Thus, it is intended that the invention cover the modifications and variations of this invention provided they come within the scope of the appended claims and their equivalents. It is intended that the scope of differing terms or phrases in the claims may be fulfilled by the same or different structure(s) or step(s).

The invention claimed is:

1. An aircraft engine, said aircraft engine having a takeoff speed and a landing speed, said aircraft engine including a duct with at least a first acoustic control noise reduction tube, said tube having a tube path between a tube entrance end and a distal tube exit end, said tube having a nonobstructive frequency $f_{no}$, said tube containing a movable frequency tuner obstruction, said movable frequency tuner obstruction movable along said tube path between a first takeoff frequency obstruction tube path location with a first tube cross-section area, and an at least second landing frequency obstruction tube path location with a second tube cross-section area, said frequency tuner obstruction positioned at said first takeoff frequency location with said takeoff speed, said frequency tuner obstruction positioned at said second landing frequency location with said landing speed with said frequency tuner obstruction having a tuner obstruction cross-section area wherein said tuner obstruction cross-section area is no greater than 99% of said first tube cross-section area and said tuner obstruction cross-section area is no greater than 99% of said second tube cross-section area.

2. An aircraft engine as claimed in claim 1, said tuner obstruction cross-section area is greater than 50% of said first tube cross-section area.

3. An aircraft engine as claimed in claim 1, wherein said frequency tuner obstruction positioned at said first takeoff frequency location minimizes an impedance of said acoustic control noise reduction tube to maximize an acoustic energy going through said acoustic control noise reduction tube.

4. An aircraft engine as claimed in claim 1, including a motor for moving said movable frequency tuner obstruction movable along said tube path.

5. An aircraft engine as claimed in claim 1, wherein said movable frequency tuner obstruction is comprised of a ball.

6. An aircraft engine as claimed in claim 1, wherein said movable frequency tuner obstruction has a smooth curved outer surface.

7. An aircraft engine as claimed in claim 1, wherein said movable frequency tuner obstruction is spherical.

8. An aircraft engine as claimed in claim 1, wherein said movable frequency tuner obstruction is nonspherical.

9. An aircraft noise reduction system for an aircraft engine having a plurality of aircraft engine operating speeds including a takeoff speed and a landing speed, said aircraft engine including a fan duct with at least a first acoustic control noise reduction tube, said acoustic control noise reduction tube having a tube path between a tube entrance end and a distal tube exit end, said acoustic control noise reduction tube containing a movable frequency tuner ball, said movable frequency tuner ball movable along said tube path between a first takeoff frequency ball location with a first tube cross-section area, and an at least second landing frequency ball location with a second tube cross-section area, said frequency tuner ball positioned at said first takeoff frequency ball location with said takeoff speed, said frequency tuner ball positioned at said second landing frequency location with said landing speed wherein said movable frequency tuner ball location along said tube path reducing noise generated by said aircraft engine operating at said aircraft engine operating speeds with said frequency tuner ball having a tuner obstruction cross-section area wherein said tuner obstruction cross-section area is no greater than 99% of said first tube cross-section area and said tuner obstruction cross-section area is no greater than 99% of said second tube cross-section area.

10. An aircraft noise reduction system as claimed in claim 9, said tuner obstruction cross-section area is greater than 50% of said first tube cross-section area.

11. An aircraft noise reduction system as claimed in claim 9, wherein said frequency tuner ball positioned at said first takeoff frequency location minimizes an impedance of said acoustic control noise reduction tube to maximize an acoustic energy going through said acoustic control noise reduction tube.

12. An aircraft noise reduction system as claimed in claim 9, including a motor for moving said movable frequency tuner ball along said tube path.

13. An aircraft noise reduction system as claimed in claim 12, including a drive shaft between said motor and said ball.

14. An aircraft noise reduction system as claimed in claim 9, including a second acoustic control noise reduction tube, said second acoustic control noise reduction tube aligned with said first acoustic control noise reduction tube and having a second tube path between a second tube entrance end and a second tube distal tube exit end, said acoustic control noise reduction second tube containing a second tube movable frequency tuner ball, said second tube movable frequency tuner ball movable along said second tube path between a second tube first takeoff frequency ball location, and a second tube second landing frequency ball location, said second tube frequency tuner ball positioned at said second tube first takeoff frequency ball location with said takeoff speed, and said second tube frequency tuner ball positioned at said second tube second landing frequency location with said landing speed wherein said second tube movable frequency tuner ball location along said second tube path reducing noise generated by said aircraft engine operating at said aircraft engine operating speeds.

15. An aircraft noise reduction system as claimed in claim 14, wherein said first acoustic control noise reduction tube is a first fore acoustic control noise reduction tube and said second acoustic control noise reduction tube is a second aft acoustic control noise reduction tube.

16. An aircraft noise reduction system as claimed in claim 15, including a ball moving motor, said ball moving motor moving both said first fore tube movable frequency tuner ball and said second aft tube movable frequency tuner ball.

17. An aircraft noise reduction system as claimed in claim 16, wherein said ball moving motor is mounted between first fore acoustic control noise reduction tube and said second aft acoustic control noise reduction tube.

18. An aircraft noise reduction system as claimed in claim 9 wherein said ball is moved by an aircraft transition between a plurality of aircraft flight stages.

19. An aircraft noise reduction system as claimed in claim 15, wherein said balls are moved by an aircraft transition between a plurality of aircraft flight stages.

20. An aircraft noise reduction system as claimed in claim 9 wherein said ball has a smooth curved outer surface.

21. An aircraft noise reduction system as claimed in claim 9 wherein said ball is spherical.

22. A vehicle noise reduction system for a vehicle having troublesome oscillations in gas pressure, said vehicle noise reduction system including at least a first acoustic control noise reduction tube, said acoustic control noise reduction tube having a fixed nonvariable path length tube path between a tube entrance end and a distal tube exit end, said acoustic control noise reduction tube containing at least a first movable frequency tuner ball obstruction, said movable frequency tuner ball obstruction movable along said tube path between a first frequency obstruction tube path ball location with a first tube cross-section area, and at least a second frequency obstruction tube path ball location with a second tube cross-section area, said frequency tuner ball obstruction positioned at said first frequency ball location for a first operation speed noise reduction of a first troublesome noise oscillation, said frequency tuner ball positioned at said second frequency location for a second operation speed noise reduction of a second troublesome noise oscillation, wherein said movable frequency tuner ball location along said tube path reduces noise generated by said oscillations in gas pressure while operating at a plurality of operating speeds with said frequency tuner ball obstruction having a tuner obstruction cross-section area wherein said tuner obstruction cross-section area is no greater than 99% of said first tube cross-section area and said tuner obstruction cross-section area is no greater than 99% of said second tube cross-section area.

23. A noise reduction system as claimed in claim 22, wherein said tuner ball obstruction cross-section area is greater than 50% of said first tube cross-section area.

24. A noise reduction system as claimed in claim 22, wherein said frequency tuner obstruction positioned at said first location minimizes an impedance of said acoustic control noise reduction tube to maximize an acoustic energy going through said acoustic control noise reduction tube at said first operation speed and said frequency tuner obstruction positioned at said second location minimizes an impedance of said acoustic control noise reduction tube to maximize an acoustic energy going through said acoustic control noise reduction tube at said second operation speed.

25. A noise reduction system as claimed in claim 22, including a motor for moving said movable frequency tuner ball along said tube path.

26. A noise reduction system as claimed in claim 25, including a drive shaft between said motor and said ball.

27. A noise reduction system as claimed in claim 22, including a second acoustic control noise reduction tube, said second acoustic control noise reduction tube aligned with said first acoustic control noise reduction tube and having a second tube path between a second tube entrance end and a second tube distal tube exit end, said acoustic control noise reduction second tube containing a second tube movable frequency tuner ball, said second tube movable frequency tuner ball movable along said second tube path between a second tube first takeoff frequency ball location, a second tube second cruising frequency ball location, and a second tube third landing frequency ball location, said second tube frequency tuner ball positioned at said second tube first takeoff frequency ball location with said takeoff speed, said second tube frequency tuner ball positioned at said second tube second cruising frequency location with said cruising speed, and said second tube frequency tuner ball positioned at said second tube third landing frequency location with said landing speed wherein said second tube movable frequency tuner ball location along said second tube path reducing noise generated by said aircraft engine operating at said aircraft engine operating speeds.

28. A noise reduction system as claimed in claim 27, wherein said first acoustic control noise reduction tube is a first fore acoustic control noise reduction tube and said second acoustic control noise reduction tube is a second aft acoustic control noise reduction tube.

29. A noise reduction system as claimed in claim 28, including a ball moving motor, said ball moving motor moving both said first fore tube movable frequency tuner ball and said second aft tube movable frequency tuner ball.

30. A noise reduction system as claimed in claim 29, wherein said ball moving motor is mounted between first fore acoustic control noise reduction tube and said second aft acoustic control noise reduction tube.

31. A noise reduction system as claimed in claim 22, wherein said ball is moved by a vehicle transition between a plurality of operational stages.

32. A noise reduction system for a gas mover having a plurality of operating speeds including a first speed, a second speed, said noise reduction system including a gas moving duct with at least a first acoustic control noise reduction tube, said acoustic control noise reduction tube having a tube path between a tube entrance end and a distal tube exit end, said acoustic control noise reduction tube containing a movable frequency tuner ball, said movable frequency tuner ball movable along said tube path between a first operating speed frequency ball location with a first tube cross-section area, and at least a second operating speed frequency ball location with a second tube cross-section area, said frequency tuner ball positioned at said first frequency ball location with said first operating speed, said frequency tuner ball positioned at said second frequency location with said second operating speed, wherein said movable frequency tuner ball location along said tube path reducing noise generated by said gas mover operating at said plurality of operating speeds with said frequency tuner ball having a tuner obstruction cross-section area wherein said tuner obstruction cross-section area is no greater than 99% of said first tube cross-section area and said tuner obstruction cross-section area is no greater than 99% of said second tube cross-section area.

33. A noise reduction system as claimed in claim 32, wherein said plurality of operating speeds includes a third speed, and said frequency tuner obstruction ball is positioned at a third speed frequency location with said third speed.

34. A noise reduction system as claimed in claim 32, wherein said tuner ball obstruction cross-section area is greater than 50% of said first tube cross-section area.

35. A noise reduction system as claimed in claim 32, wherein said frequency tuner ball positioned at said first frequency location minimizes an impedance of said acoustic control noise reduction tube to maximize an acoustic energy going through said acoustic control noise reduction tube.

36. A noise reduction system as claimed in claim 32, including a motor for moving said movable frequency tuner ball along said tube path.

37. A noise reduction system as claimed in claim 32, including a drive shaft between said motor and said ball.

38. A noise reduction system as claimed in claim 32, including a second acoustic control noise reduction tube, said second acoustic control noise reduction tube having a second tube path between a second tube entrance end and a second tube distal tube exit end, said acoustic control noise reduction second tube containing a second tube movable frequency tuner ball, said second tube movable frequency tuner ball movable along said second tube path between a second tube first frequency ball location, a second tube second frequency ball location, and a second tube third frequency ball location, said second tube frequency tuner ball positioned at said second tube first frequency ball location with said first speed, said second tube frequency tuner ball positioned at said second tube second speed frequency location with said second speed, and said second tube path reducing noise generated by said gas mover operating at said operating speeds.

39. A noise reduction system as claimed in claim 38, wherein said first acoustic control noise reduction tube is a first fore acoustic control noise reduction tube and said second acoustic control noise reduction tube is a second aft acoustic control noise reduction tube.

40. A noise reduction system as claimed in claim 39 including a ball moving motor, said ball moving motor moving both said first fore tube movable frequency tuner ball and said second aft tube movable frequency tuner ball.

41. A noise reduction system as claimed in claim 40, wherein said ball moving motor is mounted between first fore acoustic control noise reduction tube and said second aft acoustic control noise reduction tube.

42. A noise reduction system as claimed in claim 32, wherein said ball is moved by a transition between a plurality of operational stages.

43. A method of reducing noise in a machine having a plurality of troublesome noises and a plurality of operation modes, said method including providing a machine having a first operation mode with a first operation mode noise, said machine having at least a second operation mode with a second operation mode noise, providing a noise reduction system having at least a first acoustic control noise reduction tube, said acoustic control noise reduction tube having a tube path between a tube entrance end and a distal tube exit end, said acoustic control noise reduction tube containing a movable frequency tuner obstruction, said movable frequency tuner obstruction movable along said tube path between a first operation mode obstruction tube path first frequency location with a first tube cross-section area, and at least a second operation mode with a second tube cross-section area with said frequency tuner obstruction positioned at said first frequency location with said first operation mode, and said frequency tuner obstruction positioned at said second frequency location with said second operation mode with said frequency tuner obstruction having a tuner obstruction cross-section area with said tuner obstruction cross-section area no greater than 99% of said first tube cross-section area and said tuner obstruction cross-section area no greater than 99% of said second tube cross-section area with said movable frequency tuner obstruction location along said tube path reducing said noise generated by said machine operation modes.

44. A method as claimed in claim 43, wherein said tuner obstruction cross-section area is greater than 50% of said first tube cross-section area.

45. A method as claimed in claim 43, wherein said frequency tuner obstruction positioned at said first frequency location minimizing an impedance of said acoustic control noise reduction tube.

46. A method as claimed in claim 43, said method including providing a motor for moving said movable frequency tuner obstruction along said tube path.

47. A method as claimed in claim 46, said method including providing a drive shaft between said motor and said obstruction.

48. A method as claimed in claim 43, said method including providing a second acoustic control noise reduction tube, said second acoustic control noise reduction tube having a second tube path between a second tube entrance end and a second tube distal tube exit end, said acoustic control noise reduction second tube containing a second tube movable frequency tuner obstruction, said second tube movable frequency tuner obstruction movable along said second tube path between a second tube first frequency obstruction tube path location, a second tube second frequency obstruction tube path location, said second tube frequency tuner obstruction positioned at said second tube first frequency location with said first operation mode, said second tube frequency tuner obstruction positioned at said second tube second frequency location with said second operation mode, wherein said second tube movable frequency tuner obstruction location along said second tube path reducing noise generated by said machine operation modes.

49. A method as claimed in claim 48, said wherein said first acoustic control noise reduction tube is a first fore acoustic control noise reduction tube and said second acoustic control noise reduction tube is a second aft acoustic control noise reduction tube aligned with said first tube.

50. A method as claimed in claim 48 including an obstruction moving motor, said obstruction moving motor moving both said first fore tube movable frequency tuner obstruction and said second aft tube movable frequency tuner obstruction.

51. A method as claimed in claim 49, wherein said motor is mounted between first fore acoustic control noise reduction tube and said second aft acoustic control noise reduction tube.

52. A method as claimed in claim 43, wherein said obstruction is moved by a transition between operation modes.

* * * * *